(12) United States Patent
Kizu et al.

(10) Patent No.: US 9,488,842 B2
(45) Date of Patent: Nov. 8, 2016

(54) LIQUID CRYSTAL OPTICAL DEVICE AND STEREOSCOPIC IMAGE DISPLAY DEVICE

(71) Applicant: Kabushiki Kaisha Toshiba, Minato-ku (JP)

(72) Inventors: Yuko Kizu, Kanagawa-ken (JP); Shinichi Uehara, Tokyo (JP); Ayako Takagi, Kanagawa-ken (JP); Masako Kashiwagi, Kanagawa-ken (JP); Machiko Ito, Kanagawa-ken (JP); Masahiro Baba, Kanagawa-ken (JP); Hajime Yamaguchi, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 120 days.

(21) Appl. No.: 14/218,641

(22) Filed: Mar. 18, 2014

(65) Prior Publication Data

US 2014/0198271 A1    Jul. 17, 2014

Related U.S. Application Data

(63) Continuation of application No. PCT/JP2012/050409, filed on Jan. 11, 2012.

(51) Int. Cl.
*G02F 1/1337* (2006.01)
*G02B 27/22* (2006.01)
(Continued)

(52) U.S. Cl.
CPC ........... *G02B 27/22* (2013.01); *G02B 27/2214* (2013.01); *G02F 1/1337* (2013.01); *H04N 13/042* (2013.01); *H04N 13/0452* (2013.01);
(Continued)

(58) Field of Classification Search
CPC ..................................................... G02F 1/1337
See application file for complete search history.

(56) References Cited

U.S. PATENT DOCUMENTS 6,160,600 A    12/2000  Yamazaki et al.
7,250,923 B2    7/2007  Taira et al.
(Continued)

FOREIGN PATENT DOCUMENTS

EP    1189100 B1    4/2003
JP    7-072491 A    3/1995
(Continued)

OTHER PUBLICATIONS

Japanese Office Action issued Nov. 10, 2014 in Patent Application No. 2013-553140 (with English Translation).
(Continued)

*Primary Examiner* — Timothy L Rude
(74) *Attorney, Agent, or Firm* — Oblon, McClelland, Maier & Neustadt, L.L.P.

(57) ABSTRACT

According to one embodiment, a liquid crystal optical device includes first and second substrate units and a liquid crystal layer. The first substrate unit includes a first substrate having a first major surface, and a first electrode extending along a first direction. The second substrate unit includes a second substrate and a first opposing electrode. The liquid crystal layer is provided between the first substrate unit and the second substrate unit and includes a first portion provided on a side of the first substrate unit and a second portion provided on a side of the second substrate unit. The first portion has a vertical alignment. The second portion has a horizontal alignment. A long axis of liquid crystal molecules in the second portion aligns along a second direction perpendicular to the first direction.

15 Claims, 16 Drawing Sheets

(51) Int. Cl.
*H04N 13/04* (2006.01)
*G02F 1/1343* (2006.01)

(52) U.S. Cl.
CPC .............. *G02F 2001/133773* (2013.01); *G02F 2001/134381* (2013.01); *G02F 2203/28* (2013.01); *H04N 2213/001* (2013.01)

(56) References Cited

U.S. PATENT DOCUMENTS

| | | | |
|---|---|---|---|
| 7,495,634 B2 | 2/2009 | Takagi et al. | |
| 7,777,950 B2 | 8/2010 | Takagi et al. | |
| 7,830,601 B2 | 11/2010 | Takagi et al. | |
| 8,174,465 B2 | 5/2012 | Takagi et al. | |
| 8,482,684 B2 | 7/2013 | Takagi et al. | |
| 8,488,073 B2 | 7/2013 | Takagi et al. | |
| 8,675,148 B2 | 3/2014 | Takagi et al. | |
| 2010/0238276 A1 | 9/2010 | Takagi et al. | |
| 2012/0300042 A1* | 11/2012 | Yun | H04N 13/0404 348/51 |
| 2012/0327068 A1 | 12/2012 | Takagi et al. | |
| 2013/0258219 A1 | 10/2013 | Takagi et al. | |
| 2013/0265527 A1* | 10/2013 | Takeuchi | C09K 19/3066 349/86 |

FOREIGN PATENT DOCUMENTS

| | | |
|---|---|---|
| JP | 9-146108 A | 6/1997 |
| JP | 2000-102038 A | 4/2000 |
| JP | 2010-224191 A | 10/2010 |
| JP | 2011-028286 A | 2/2011 |
| JP | 2011-053692 A | 3/2011 |

OTHER PUBLICATIONS

Japanese Office Action issued Jan. 9, 2015, in Japan Patent Application No. 2013-553140 (with English translation).
International Search Report mailed Mar. 13, 2012 for PCT/JP2012/050409 filed Jan. 11, 2012 with English Translation of Categories.
International Written Opinion mailed Mar. 13, 2012 for PCT/JP2012/050409 filed Jan. 11, 2012.
Taiwan Office Action issued on Jan. 22, 2014 in the counterpart Taiwan patent application No. 101102674 with English Translation.
U.S. Appl. No. 14/164,589.

* cited by examiner

LIQUID CRYSTAL OPTICAL DEVICE AND STEREOSCOPIC IMAGE DISPLAY DEVICE

CROSS-REFERENCE TO RELATED APPLICATIONS

This is a continuation application of International Application PCT/JP2012/050409, filed on Jan. 11, 2012; the entire contents of which are incorporated herein by reference.

FIELD

Embodiments described herein relate generally to a liquid crystal optical device and a stereoscopic image display device.

BACKGROUND

A liquid crystal optical device is known that utilizes the birefringence of liquid crystal molecules to change the distribution of the refractive index according to the application of a voltage. There is a stereoscopic image display device that combines such a liquid crystal optical device with an image display unit.

Such a stereoscopic image display device switches between a state in which an image displayed on the image display unit is caused to be incident on the eyes of a viewer as displayed on the image display unit and a state in which the image displayed on the image display unit is caused to be incident on the eyes of the viewer as multiple parallax images by changing the distribution of the refractive index of the liquid crystal optical device. Thereby, a high definition two-dimensional pixel display operation and a three-dimensional image display operation are realized, where the three-dimensional image display operation includes autostereoscopic viewing with the naked eyes due to the multiple parallax images. A comfortably-viewable display is desirable for such a display device.

DETAILED DESCRIPTION

Figure 1:
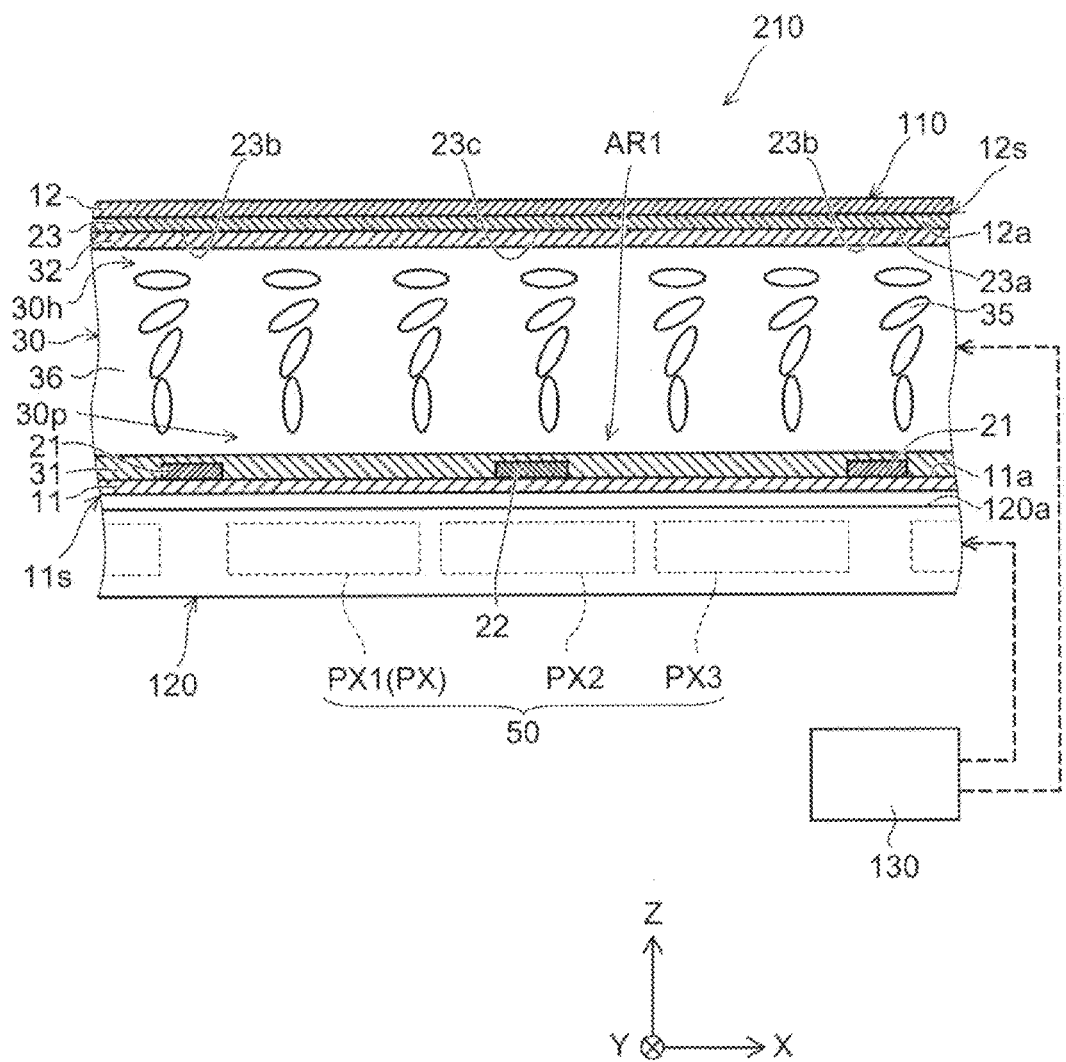
FIG. 1 is a schematic cross-sectional view showing a configuration of a stereoscopic image display device according to a first embodiment.

According to one embodiment, a liquid crystal optical device includes a first substrate unit, a second substrate unit, and a liquid crystal layer. The first substrate unit includes a first substrate having a first major surface, and a first electrode provided on the first major surface. The first electrode extends along a first direction. The second substrate unit includes a second substrate having a second major surface opposing the first major surface, and a first opposing electrode provided on the second major surface. The first opposing electrode overlays the first electrode when projected onto the first major surface. The liquid crystal layer is provided between the first substrate unit and the second substrate unit. The liquid crystal layer includes a first portion provided on a side of the first substrate unit and a second portion provided on a side of the second substrate unit. The first portion has a vertical alignment. The second portion has a horizontal alignment. A long axis of liquid crystal molecules in the second portion aligns along a second direction perpendicular to the first direction.

According to one embodiment, a stereoscopic image display device includes a liquid crystal optical device and an image display unit. The liquid crystal optical device includes a first substrate unit, a second substrate unit, and a liquid crystal layer. The first substrate unit includes a first substrate having a first major surface; and a first electrode provided on the first major surface. The first electrode extends along a first direction. The second substrate unit includes a second substrate having a second major surface opposing the first major surface; and a first opposing electrode provided on the second major surface. The first opposing electrode overlays the first electrode when projected onto the first major surface. The liquid crystal layer is provided between the first substrate unit and the second substrate unit. The liquid crystal layer includes a first portion provided on a side of the first substrate unit and a second portion provided on a side of the second substrate unit. The first portion has a vertical alignment. The second portion has a horizontal alignment. A long axis of liquid crystal molecules in the second portion aligns along a second direction perpendicular to the first direction. The image display unit is stacked with the liquid crystal optical device. The image display unit is configured to display an image.

Various embodiments will be described hereinafter in detail with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

FIG. 1 is a schematic cross-sectional view illustrating a configuration of a stereoscopic image display device according to a first embodiment.

Figure 2:
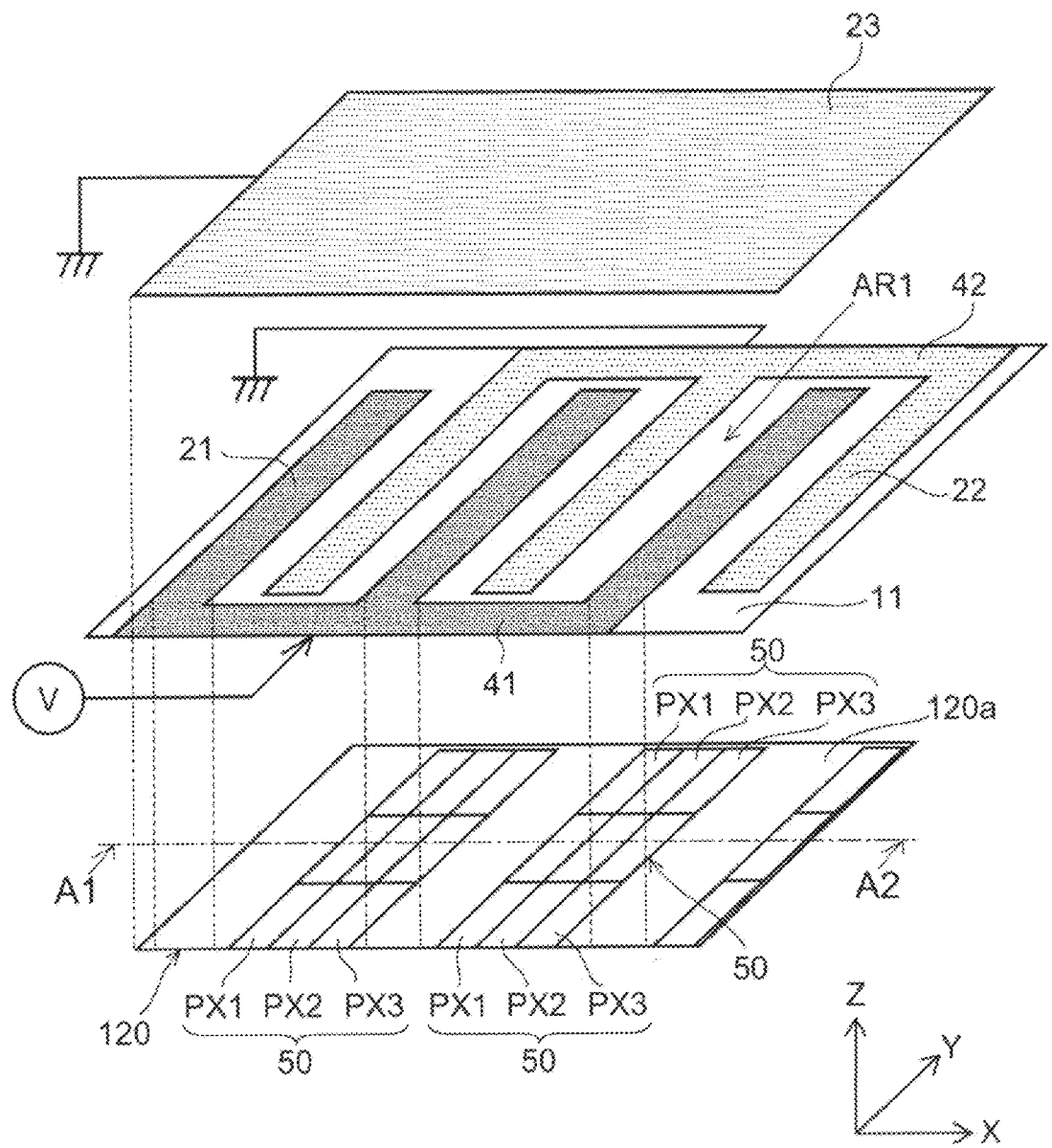
FIG. 2 is a schematic perspective view showing the configuration of a portion of the stereoscopic image display device according to the first embodiment.

FIG. 2 is a schematic perspective view illustrating the configuration of a portion of the stereoscopic image display device according to the first embodiment.

FIG. 1 schematically shows a cross section along line A1-A2 of FIG. 2.

As shown in FIG. 1 and FIG. 2, the stereoscopic image display device 210 includes a liquid crystal optical device 110, an image display unit 120, and a control circuit 130.

The image display unit 120 has an image display surface 120a for displaying an image. The image display surface 120a has, for example, a rectangular configuration.

The liquid crystal optical device 110 is provided on the image display surface 120a. For example, the liquid crystal optical device 110 covers the entire image display surface 120a. The liquid crystal optical device 110 functions as, for example, a liquid crystal GRIN lens (Gradient Index lens). The distribution of the refractive index of the liquid crystal optical device 110 is changeable. One state of the distribution of the refractive index corresponds to a first state in which the image displayed on the image display surface 120a is incident on the eyes of the viewer as displayed on the image display surface 120a; and another state of the refractive index distribution corresponds to a second state in which the image displayed on the image display unit 120 is incident on the eyes of the viewer as multiple parallax images.

By changing the distribution of the refractive index of the liquid crystal optical device 110 in the stereoscopic image display device 210, it is possible to selectively switch between a display of a two-dimensional image (called a 2D display hereinbelow) and a display of a three-dimensional image (called a 3D display hereinbelow) for which autostereoscopic viewing is possible with the naked eyes.

The control circuit 130 is electrically connected to the liquid crystal optical device 110. In the example, the control circuit 130 is electrically connected also to the image display unit 120. The control circuit 130 controls the operations of the liquid crystal optical device 110 and the image display unit 120. For example, the control circuit 130 performs the switching between the first state and the second state of the liquid crystal optical device 110. An image signal is input to the control circuit 130 by using a recording medium, an external input, etc. The control circuit 130 controls the operation of the image display unit 120 based on the image signal that is input. An image corresponding to the image signal that is input is displayed on the image display surface 120a. The control circuit 130 may be included in the image display unit 120.

In the case where the control circuit 130 performs the 2D display, the control circuit 130 switches the liquid crystal optical device 110 to the first state and causes the image display unit 120 to display the image for the 2D display. On the other hand, in the case where the control circuit 130 performs the 3D display, the control circuit 130 switches the liquid crystal optical device 110 to the second state and causes the image display unit 120 to display the image for the 3D display.

The liquid crystal optical device 110 includes a first substrate unit 11s, a second substrate unit 12s, and a liquid crystal layer 30. The first substrate unit 11s includes a first substrate 11, a first electrode 21, and a second electrode 22. The second substrate unit 12s includes a second substrate 12 and a first opposing electrode 23.

The first substrate 11 has a first major surface 11a. The second substrate 12 has a second major surface 12a opposing the first major surface 11a. The first electrode 21 is multiply provided on the first major surface 11a. Each of the multiple first electrodes 21 extends along a first direction; and the multiple first electrodes 21 are disposed to be separated from each other by a spacing in a second direction perpendicular to the first direction. For example, the spacing between the multiple first electrodes 21 is constant. The first electrode 21 has, for example, a substantially rectangular configuration.

A direction perpendicular to the first major surface 11a and the second major surface 12a is taken as a Z-axis direction. One direction perpendicular to the Z-axis direction is taken as an X-axis direction. A direction perpendicular to the Z-axis direction and the X-axis direction is taken as a Y-axis direction. In the example, the Y-axis direction is taken to be the first direction. The X-axis direction is taken to be the second direction. However, in the embodiments, the first direction may be any direction perpendicular to the Z-axis direction; and the first direction may be any direction along the first major surface 11a.

The first major surface 11a is substantially parallel to the second major surface 12a. In the example, one side of two mutually-perpendicular sides of the rectangular image display surface 120a is parallel to the X-axis direction; and the other side is parallel to the Y-axis direction. The orientations of the sides of the image display surface 120a are not limited thereto and may include any direction perpendicular to the Z-axis direction.

The second electrode 22 extends along the first direction to be separated from the first electrode 21 by a spacing in the second direction. The second electrode 22 is provided respectively in the spaces between the multiple first electrodes 21. For example, the second electrode 22 is disposed at substantially the center between two mutually-adjacent first electrodes 21. The second electrode 22 overlays a central line of the two mutually-adjacent first electrodes 21. The first electrode 21 and the second electrode 22 are arranged alternately in the X-axis direction. For example, the second electrode 22 is multiply provided on the first major surface 11a. The second electrode 22 has a rectangular configuration extending along the Y-axis direction. The lengths of the first electrode 21 and the second electrode 22 in the Y-axis direction are slightly longer than the length of the image display surface 120a in the Y-axis direction. The first electrode 21 and the second electrode 22 cross the image display surface 120a in the Y-axis direction.

One end of each of the multiple first electrodes 21 is connected to a first interconnect unit 41. The configuration that includes the multiple first electrodes 21 and the first interconnect unit 41 is a comb-like configuration. A voltage can be applied to each of the multiple first electrodes 21 by applying the voltage to the first interconnect unit 41. The end portions of the multiple second electrodes 22 on the side opposite to those of the first electrodes 21 are connected to a second interconnect unit 42. A voltage can be applied to each of the multiple second electrodes 22 by applying the voltage to the second interconnect unit 42.

The second substrate unit 12s opposes the first substrate unit 11s. The second major surface 12a of the second substrate 12 opposes the first major surface 11a. The first opposing electrode 23 is provided on the second major surface 12a. The first opposing electrode 23 opposes each of the multiple first electrodes 21 and each of the multiple second electrodes 22. The first opposing electrode 23 is larger than the first electrode 21 and covers the first electrode 21 when viewed in the Z-axis direction. In the example, the first opposing electrode 23 has portions 23b opposing the multiple first electrodes 21 and a portion 23c opposing the second electrode 22. For example, the first opposing electrode 23 has a third major surface 23a; and the third major surface 23a has the portions 23b opposing the multiple first electrodes 21 and the portion 23c opposing the second electrode 22.

The first electrode 21, the second electrode 22, and the first opposing electrode 23 are electrically connected to the control circuit 130 by not-shown interconnects. The application of the voltage (the setting of the potential) to the first electrode 21, the second electrode 22, and the first opposing electrode 23 is controlled by the control circuit 130. The switching between the first state and the second state of the liquid crystal optical device 110 is performed by applying the voltage (setting the potential) to the first electrode 21, the second electrode 22, and the first opposing electrode 23.

The liquid crystal layer 30 is provided between the first substrate unit 11s and the second substrate unit 12s. The liquid crystal layer 30 includes a liquid crystal material 36 that includes multiple liquid crystal molecules 35. The liquid crystal material 36 is a liquid crystal medium. The liquid crystal layer 30 may include, for example, a nematic liquid crystal. The dielectric anisotropy of the liquid crystal layer 30 is positive or negative. Hereinbelow, the case will be described where a nematic liquid crystal having a positive dielectric anisotropy is used as the liquid crystal layer 30.

A first alignment film 31 is provided between the first substrate unit 11s and the liquid crystal layer 30. The first alignment film 31 causes the liquid crystal molecules 35 to have a vertical alignment. A second alignment film 32 is provided between the second substrate unit 12s and the liquid crystal layer 30. The second alignment film 32 causes the liquid crystal molecules 35 to have a horizontal alignment. The second alignment film 32 causes the director (the long axis) of the liquid crystal molecules 35 to be aligned in the X-axis direction. Thereby, the liquid crystal material 36 has a hybrid alignment (Hybrid Aligned Nematic (HAN) alignment) in the state (the state shown in FIG. 1); the liquid crystal material 36 has the vertical alignment on the side of the first substrate 11 and the horizontal alignment on the side of the second substrate 12 when the voltages are not applied to the multiple first electrodes 21, the multiple second electrodes 22, and the first opposing electrode 23. A first portion 30p of the liquid crystal layer 30 on the side of the first substrate unit 11s has the vertical alignment. The long axis of the liquid crystal molecules 35 has the horizontal alignment along the X-axis direction in a second portion 30h of the liquid crystal layer 30 on the side of the second substrate unit 12s.

Herein, the horizontal alignment includes, for example, the state in which the long axis of the liquid crystal molecules 35 is within a range of not less than 0° and not more than 30° when the direction perpendicular to the Z-axis direction is taken to be 0°. The vertical alignment includes, for example, the state in which the long axis of the liquid crystal molecules 35 is within a range of not less than 60° and not more than 90°. In other words, the pretilt angle of the horizontal alignment is not less than 0° and not more than 30°. The pretilt angle of the vertical alignment is not less than 60° and not more than 90°.

The first substrate 11, the second substrate 12, the first electrode 21, the second electrode 22, and the first opposing electrode 23 may include a transparent material. The light including the image displayed on the image display unit 120 passes through the first substrate 11, the second substrate 12, the first electrode 21, the second electrode 22, and the first opposing electrode 23.

The first substrate 11 and the second substrate 12 include, for example, glass, a resin, etc. The first electrode 21, the second electrode 22, and the first opposing electrode 23 include, for example, an oxide including at least one element selected from the group consisting of In, Sn, Zn, and Ti. The first electrode 21, the second electrode 22, and the first opposing electrode 23 include, for example, ITO. The first electrode 21, the second electrode 22, and the first opposing electrode 23 may include a thin metal layer. The first alignment film 31 and the second alignment film 32 include, for example, a resin such as polyimide, etc. The material of the first alignment film 31 is different from the material of the second alignment film 32. The first alignment film 31 includes a material having a relatively small surface energy; and the second alignment film 32 includes a material having a relatively large surface energy. The first interconnect unit 41 and the second interconnect unit 42 include, for example, the material of the first electrode 21, the second electrode 22, and the first opposing electrode 23.

Thus, the liquid crystal optical device 110 includes the first substrate unit 11s, the second substrate unit 12s, and the liquid crystal layer 30. The first substrate unit 11s includes the first substrate 11, the multiple first electrodes 21, and the second electrode 22. The first substrate 11 has the first major surface 11a. The multiple first electrodes 21 are provided in the first major surface 11a. The multiple first electrodes 21 extend along the first direction to be separated from each other by a spacing in the second direction perpendicular to the first direction. The second electrode 22 is provided between the multiple first electrodes 21. The second substrate unit 12s includes the second substrate 12 and the first opposing electrode 23. The second substrate 12 has the second major surface 12a opposing the first major surface 11a. The first opposing electrode 23 is provided on the second major surface 12a to oppose the multiple first electrodes 21 and the second electrode 22. The liquid crystal layer 30 is provided between the first substrate unit 11s and the second substrate unit 12s. The first portion 30p of the liquid crystal layer 30 on the side of the first substrate unit 11s has a vertical alignment. The second portion 30h of the liquid crystal layer 30 on the side of the second substrate unit 12s has a horizontal alignment. The long axis of the liquid crystal molecules 35 in the second portion 30h aligns along a second direction perpendicular to the first direction.

The image display unit 120 includes multiple pixel groups 50 arranged in a two-dimensional matrix configuration. The image display surface 120a is formed of the multiple pixel groups 50. The pixel group 50 includes a first pixel PX1, a second pixel PX2, and a third pixel PX3. Hereinbelow, the first to third pixels PX1 to PX3 are collectively called the pixels PX. The pixel group 50 is disposed to oppose a region AR1 between two mutually-adjacent first electrodes 21. The pixel group 50 opposes the second electrode 22. The first to third pixels PX1 to PX3 that are included in the pixel group 50 are arranged in the X-axis direction. The number of multiple pixels PX included in the pixel group 50 is not limited to three and may be two, four, or more.

For example, the image display unit 120 emits light including the image displayed on the image display surface 120a. The light is in a linearly polarized light state to travel substantially in the Z-axis direction. The polarizing axis (the orientation axis in the X-Y plane of the vibration plane of the electric field) of the linearly polarized light is in the X-axis direction. In other words, the polarizing axis of the linearly polarized light is in a direction parallel to the director (the long axis) of the liquid crystal molecules 35 on the side of the second substrate unit 12s. The linearly polarized light is produced by, for example, disposing an optical filter (a polarizer) having the X-axis direction as the polarizing axis along the optical path.

As shown in FIG. 1, each of the multiple liquid crystal molecules 35 included in the liquid crystal layer 30 has the vertical alignment on the side of the first substrate unit 11s and the horizontal alignment on the side of the second substrate unit 12s in the case where a voltage is not applied to the multiple first electrodes 21, the multiple second electrodes 22, and the first opposing electrode 23. Thereby, there is a substantially uniform refractive index distribution in the X-axis direction and the Y-axis direction. Therefore, in the case where the voltage is not applied, the travel direction of the light including the image displayed on the image display unit 120 is substantially unchanged. In the case where the voltage is not applied, the liquid crystal optical device 110 is switched to the first state.

In the case where the liquid crystal optical device 110 is switched from the first state to the second state, for example, a voltage is applied to the multiple first electrodes 21; and the multiple second electrodes 22 and the first opposing electrode 23 are grounded. In other words, the absolute value of the voltage between the first electrode 21 and the first opposing electrode 23 is set to be larger than the absolute value of the voltage between the second electrode 22 and the first opposing electrode 23. For example, the effective value of the voltage between the first electrode 21 and the first opposing electrode 23 is set to be larger than the effective value of the voltage between the second electrode 22 and the first opposing electrode 23.

Figure 3:
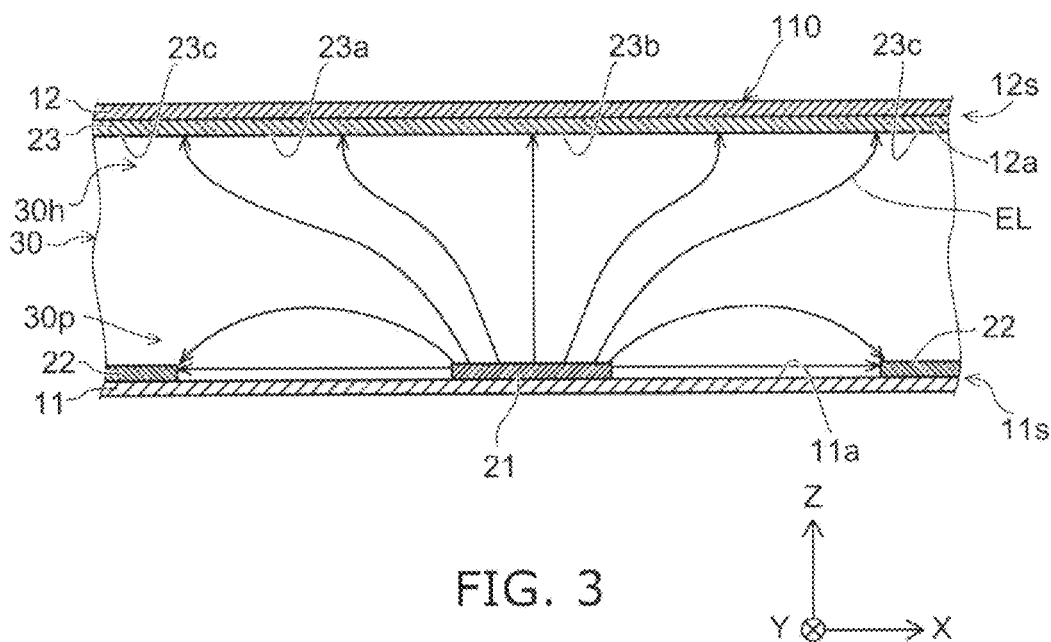
FIG. 3 is a schematic cross-sectional view showing the configuration of a portion of the stereoscopic image display device according to the first embodiment.

FIG. 3 is a schematic cross-sectional view illustrating the configuration of a portion of the stereoscopic image display device according to the first embodiment. The first alignment film 31 and the second alignment film 32 are not shown for convenience in FIG. 3. As shown in FIG. 3, lines of electric force EL are generated around the first electrode 21 when the voltages are applied to the first electrodes 21, the second electrodes 22, and the first opposing electrode 23 as recited above. For example, the lines of electric force EL have a laterally symmetric distribution centered on the first electrode 21.

Figure 4:
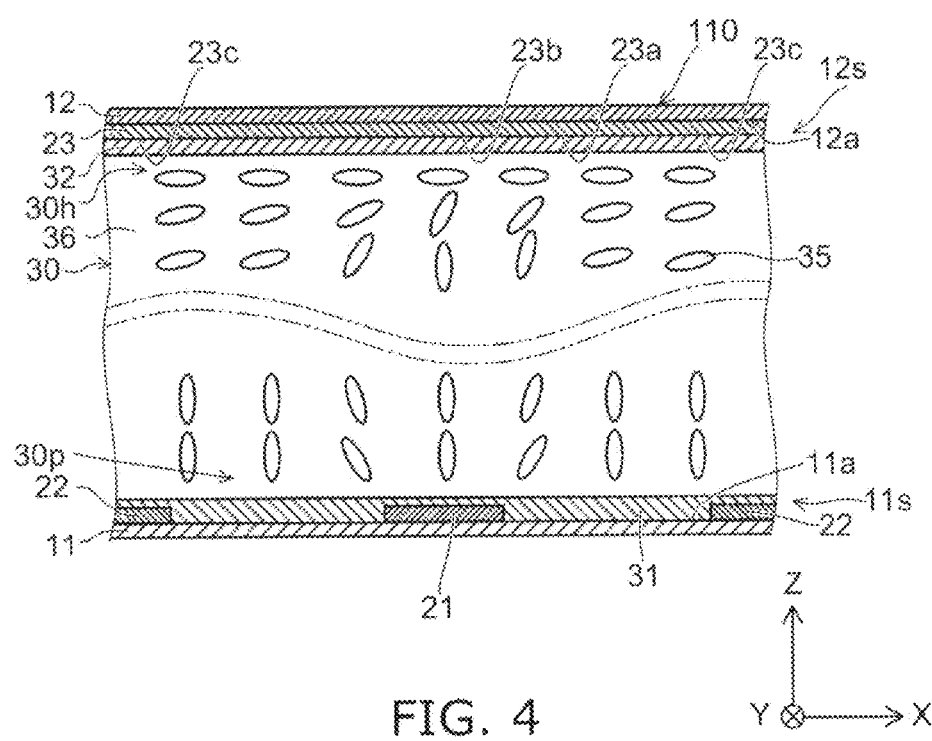
FIG. 4 is a schematic cross-sectional view showing the configuration of a portion of the stereoscopic image display device according to the first embodiment.

FIG. 4 is a schematic cross-sectional view illustrating the configuration of a portion of the stereoscopic image display device according to the first embodiment.

As shown in FIG. 4, the alignment of the liquid crystal molecules 35 deforms along the paths of the lines of electric force EL in the dense region (i.e., the strong electric field region) of the lines of electric force EL in the case where the dielectric anisotropy of the liquid crystal layer 30 is positive. In the portion where the first electrode 21 opposes the first opposing electrode 23, the liquid crystal molecules 35 on the side of the second substrate 12 that had the horizontal alignment approach the vertical alignment. On the other hand, the liquid crystal molecules 35 in the portion where the second electrode 22 opposes the first opposing electrode 23 remain in the horizontal alignment. In the portion between the first electrode 21 and the second electrode 22, the angle of the liquid crystal molecules 35 changes gradually from the second electrode 22 toward the first electrode 21 to approach the vertical alignment. The angle of the long axis of the liquid crystal molecules 35 changes in the Z-X plane along the lines of electric force EL. The angle of the long axis of the liquid crystal molecules 35 changes with the Y-axis as a rotational axis.

The liquid crystal molecules 35 are birefringent. The refractive index for the polarization of the long-axis direction of the liquid crystal molecules 35 is higher than the refractive index for the polarization of the short-axis direction of the liquid crystal molecules 35. As recited above, when the angle of the liquid crystal molecules 35 is changed, the refractive index of the liquid crystal layer 30 in the portion of the liquid crystal layer 30 opposing the second electrode 22 is high and decreases gradually from the portion opposing the second electrode 22 toward the portion opposing the first electrode 21 for the linearly polarized light traveling in the Z-axis direction with its polarizing axis aligned in the X-axis direction. Thereby, a refractive index distribution having a convex lens configuration is formed.

The first electrodes 21 and the second electrodes 22 extend along the Y-axis direction. Thereby, the refractive index distribution of the liquid crystal layer 30 has a cylindrical lens configuration extending along the Y-axis direction during the voltage application. The first electrodes 21 and the second electrodes 22 are multiply arranged alternately in the X-axis direction. Thereby, the refractive index distribution of the liquid crystal layer 30 during the voltage application has a lenticular lens configuration in which cylindrical lenses extending along the Y-axis direction are multiply arranged in the X-axis direction when the liquid crystal layer 30 is viewed as an entirety.

As recited above, the pixel group 50 of the image display unit 120 is disposed to oppose the region AR1 between the two mutually-adjacent first electrodes 21. The refractive index distribution having the convex lens configuration that is formed in the liquid crystal layer 30 opposes the pixel group 50. In the example, the portion of the refractive index distribution of the liquid crystal layer 30 where the refractive index is high opposes the second pixel PX2 disposed in the center of the pixel group 50.

Figure 5A:
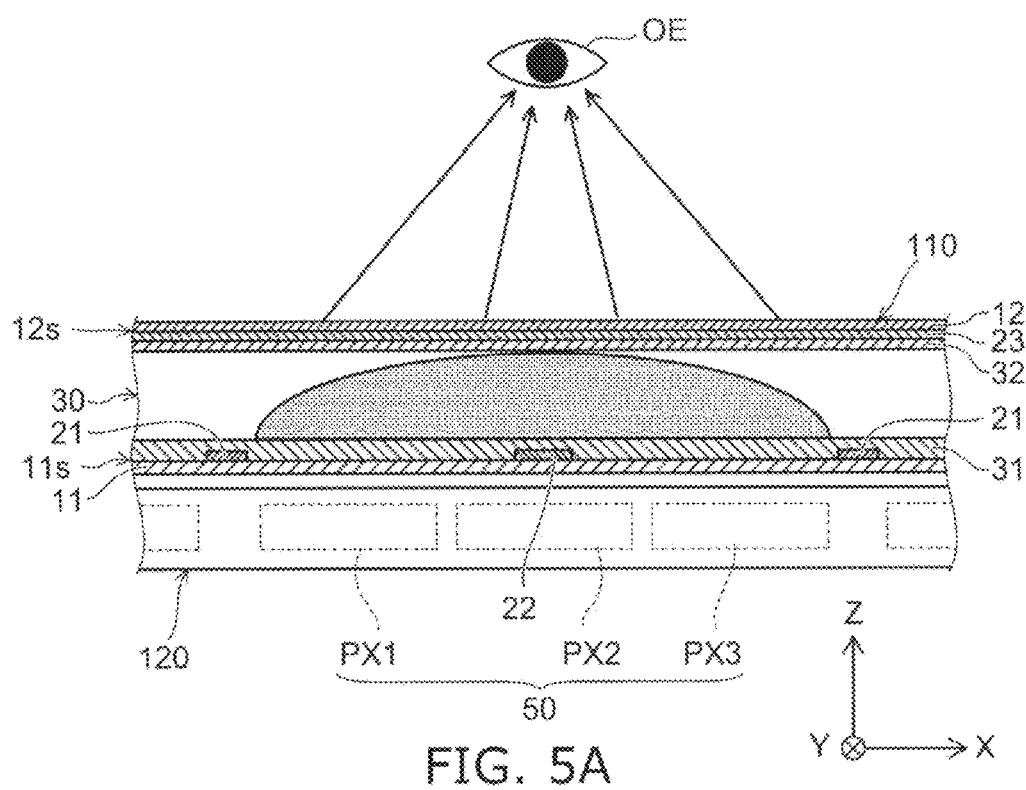
FIG. 5A and FIG. 5B are schematic cross-sectional views showing the configuration of a portion of the stereoscopic image display device according to the first embodiment.
Figure 5B:
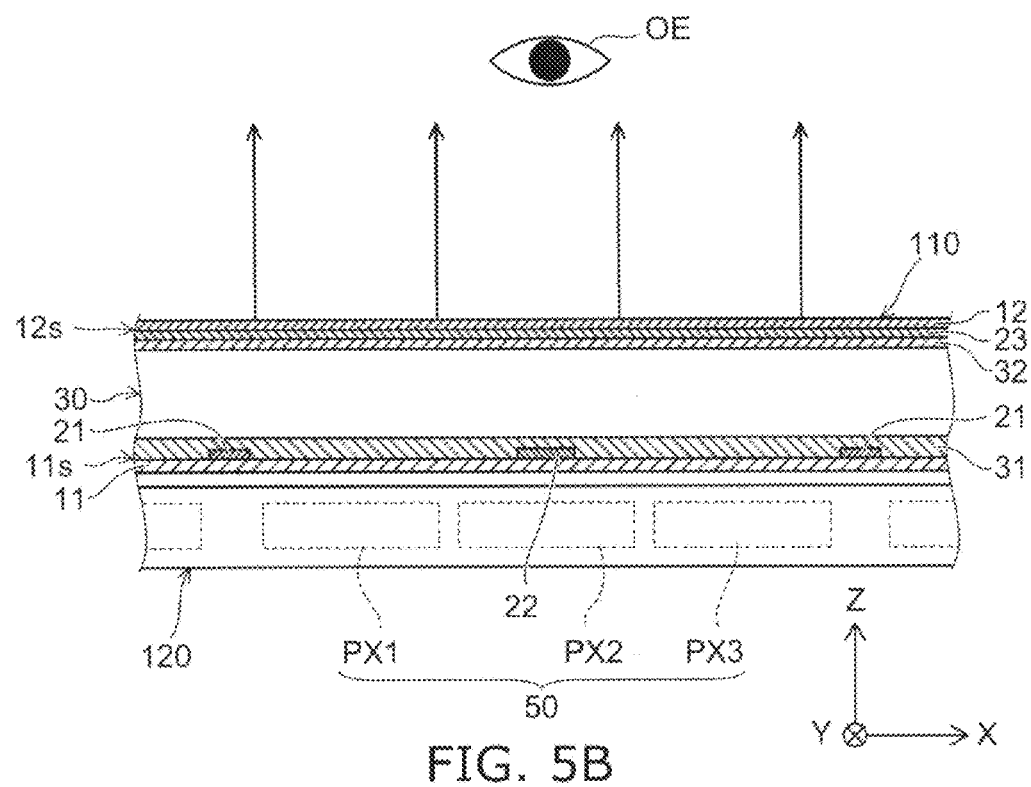

FIG. 5A and FIG. 5B are schematic cross-sectional views illustrating the configuration of a portion of the stereoscopic image display device according to the first embodiment.

As shown in FIG. 5A, the refractive index distribution of the liquid crystal layer 30 during the voltage application converges the light (the image) emitted from the pixel groups 50 toward the eyes OE of the viewer. Thereby, the image that is formed of the multiple first pixels PX1 included in the image display surface 120a becomes a first parallax image. The image that is formed of the multiple second pixels PX2 becomes a second parallax image. The image that is formed of the multiple third pixels PX3 becomes a third parallax image. The parallax image for the right eye is selectively incident on the right eye of the viewer; and the parallax image for the left eye is selectively incident on the left eye of the viewer. Thereby, a 3D display is possible. In other words, in the case where the voltage is applied, the liquid crystal optical device 110 is switched to the second state.

In the case where the liquid crystal optical device 110 is in the first state as shown in FIG. 5B, the light emitted from the pixel groups 50 travels straight and is incident on the eyes OE of the viewer. Thereby, a 2D display is possible. In the 2D display, a normal 2D image can be displayed with a resolution that is greater than that of the 3D display by a factor of the number of parallax images (in the example, three times).

Color filters that include the three primary colors RGB may be provided respectively at the multiple pixels PX. Thereby, a color display is possible. Other than the three primary colors RGB, the color filters may further include white (colorless) and other color components.

Figure 6A:
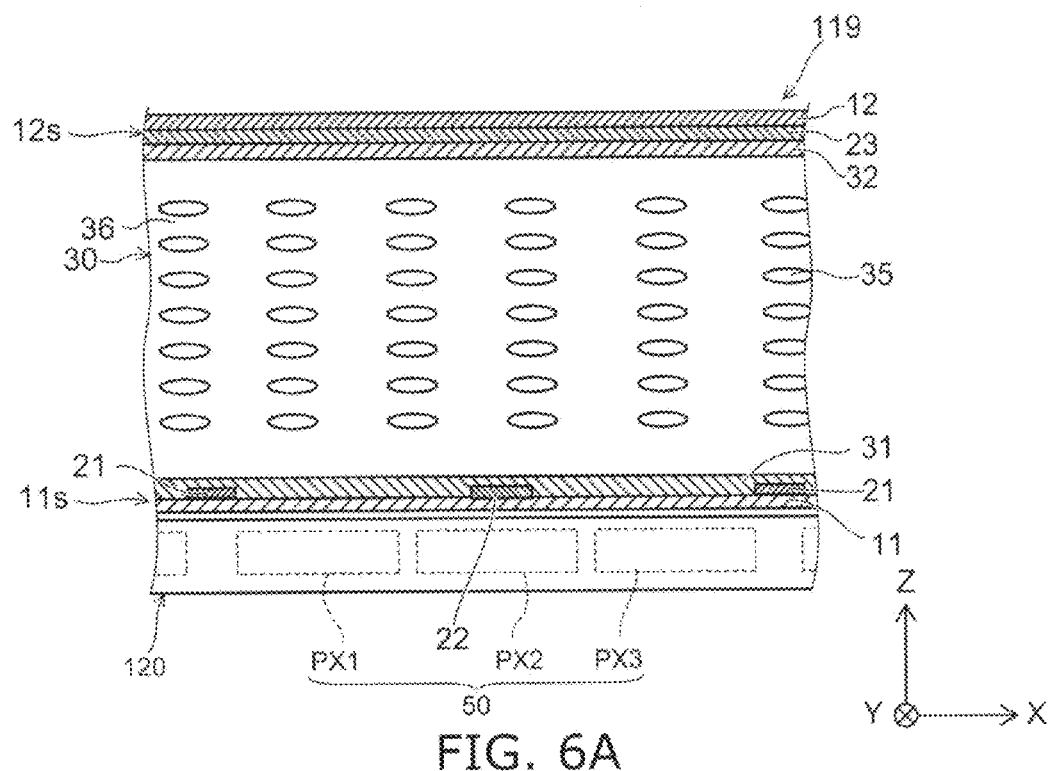
FIG. 6A and FIG. 6B are schematic cross-sectional views showing the configuration of a reference example.
Figure 6B:
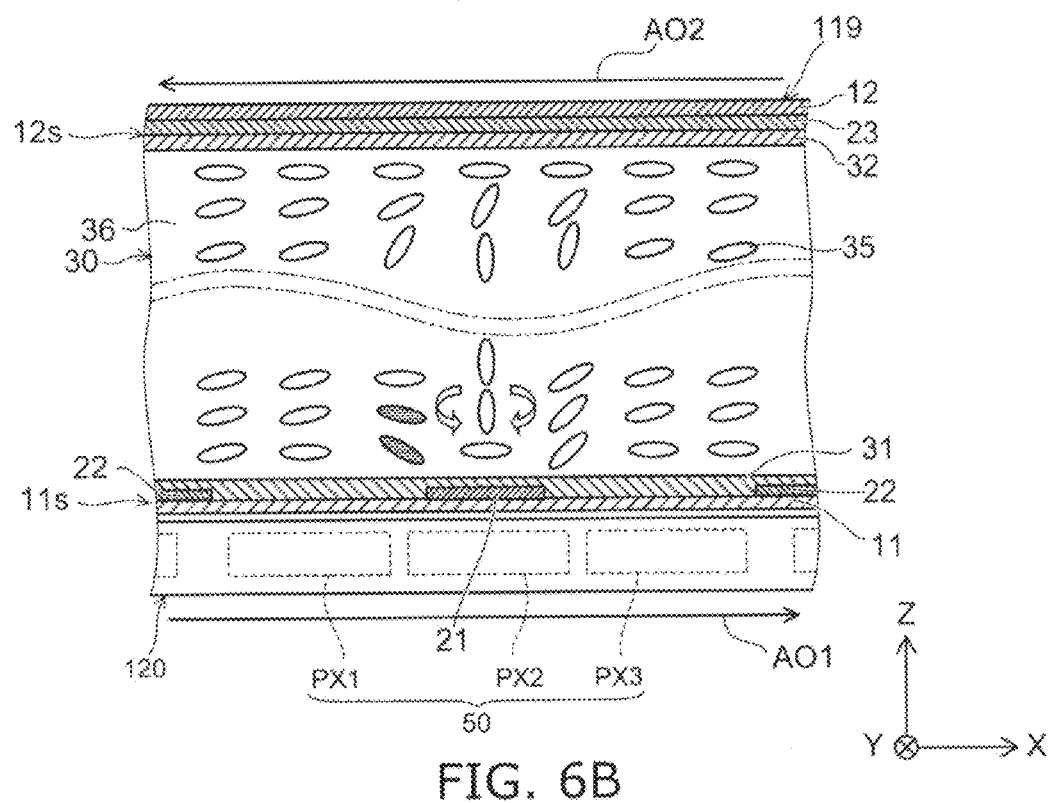

FIG. 6A and FIG. 6B are schematic cross-sectional views illustrating the configuration of a reference example. FIG. 6A is a schematic cross-sectional view showing the first state of a liquid crystal optical device 119 of the reference example. FIG. 6B is a schematic cross-sectional view showing the second state of the liquid crystal optical device 119 of the reference example. In the configuration of the optical device 119 of the reference example as shown in FIG. 6A, the alignment of the liquid crystal layer 30 is the horizontal alignment. Otherwise, the configuration of the optical device 119 is substantially the same as the configuration of the liquid crystal optical device 110.

The first alignment film 31 and the second alignment film 32 cause the long axis of the liquid crystal molecules 35 to have the horizontal alignment in the X-axis direction. Thereby, the liquid crystal molecules 35 of the liquid crystal layer 30 have the horizontal alignment in the state in which the voltage is not applied to the first electrodes 21, the second electrodes 22, and the first opposing electrode 23. Thereby, the refractive index distribution is uniform. Accordingly, in the case where the voltage is not applied to the first electrodes 21, the second electrodes 22, and the first opposing electrode 23, the liquid crystal optical device 119 is switched to the first state.

In the case where the liquid crystal optical device 119 is switched from the first state to the second state, for example, the voltage is applied to the multiple first electrodes 21; and the multiple second electrodes 22 and the first opposing electrode 23 are grounded. Thereby, the lines of electric force EL shown in FIG. 3 are generated similarly. The angle of the liquid crystal molecules 35 changes along the lines of electric force EL; and the refractive index distribution has a convex lens configuration. The state is changed from the first state to the second state by applying the voltages to the first electrodes 21, the second electrodes 22, and the first opposing electrode 23.

Thus, in the liquid crystal optical device 119 of the reference example as well, the refractive index distribution can be changed. However, it was ascertained that the liquid crystal optical device 119 has problems such as the following.

Figure 7A:
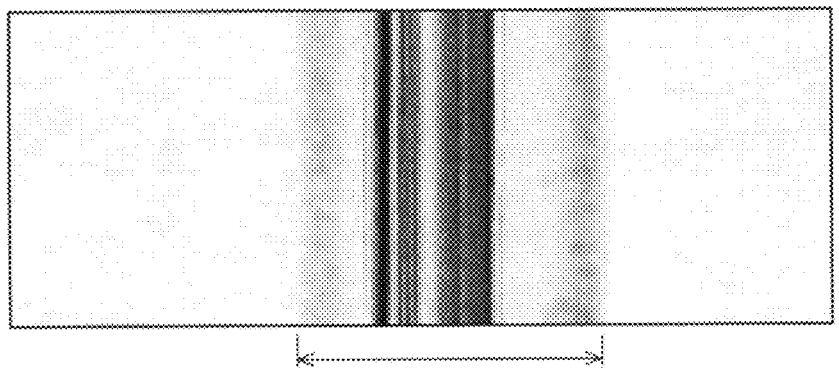
FIG. 7A and FIG. 7B are photographs showing characteristics of the reference example.
Figure 7B:
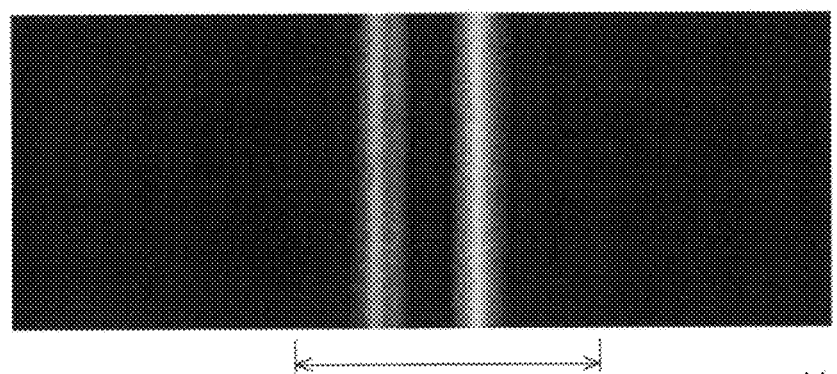

FIG. 7A and FIG. 7B are photographs illustrating characteristics of the reference example.

FIG. 7A is a photograph illustrating the state in which the liquid crystal optical device 119 between parallel polarizers is observed. FIG. 7B is a photograph illustrating the state in which the liquid crystal optical device 119 between crossed polarizers is observed. In these photographs, the liquid crystal optical device 119 is in the second state (the voltage application state). In FIG. 7A and FIG. 7B, region d1 is the portion in which the first electrode 21 exists.

In the second state of the liquid crystal optical device 119 as shown in FIG. 7A and FIG. 7B, bright lines (light leakage) occur on both sides of the center of the first electrode 21 in the X-axis direction. The bright lines cause crosstalk of the parallax images and impede the stereoscopic viewing by the viewer.

Thus, it was found that in the case where the liquid crystal optical device 119 of the reference example is used, crosstalk of the parallax images occurs due to the bright lines. The bright lines will now be described.

The state of the liquid crystal molecules 35 in the vicinity of the first electrode 21 in the second state shown in FIG. 6B will now be focused upon. The direction of the long axis of the liquid crystal molecules 35 reverses at the left-side portion of the first electrode 21. In the reference example, a direction AO1 of the alignment processing of the first alignment film 31 is the direction (the +X direction) from left to right. A direction AO2 of the alignment processing of the second alignment film 32 is a direction (the −X direction) from right to left. The liquid crystal molecules 35 have prescribed pretilt angles according to the directions of the alignment processing. During the voltage application, two portions with different tilt directions of the long axis of the liquid crystal molecules 35 appear; in a major portion the long axis of the liquid crystal molecules 35 tilts according to the pretilt; in another portion (a reverse tilt portion) the long axis of the liquid crystal molecules 35 tilts along the line of electric force that tilts reversely against the pretilt.

It is considered that a portion appears on the first electrode 21 or in the vicinity of the first electrode 21 in which the liquid crystal molecules 35 has a twist deformation to reduce the energy due to the reverse tilt. It is considered that the bright lines recited above occur when the portion occurs in which the long axis of the liquid crystal molecules 35 rotates according to the twist deformation. The results of determining the refractive index distribution and the transmittance distribution inside the liquid crystal layer 30 based on a simulation of the alignment of the liquid crystal molecules 35 of the reference example in the voltage application state will now be described.

Figure 8A:
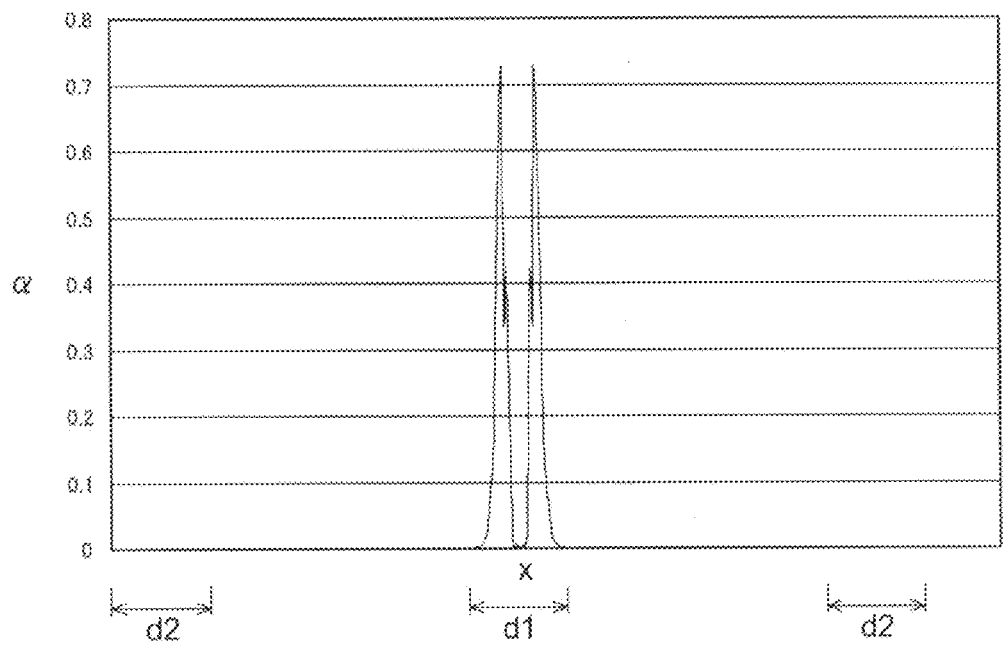
FIG. 8A and FIG. 8B are graphs showing characteristics of the reference example.
Figure 8B:
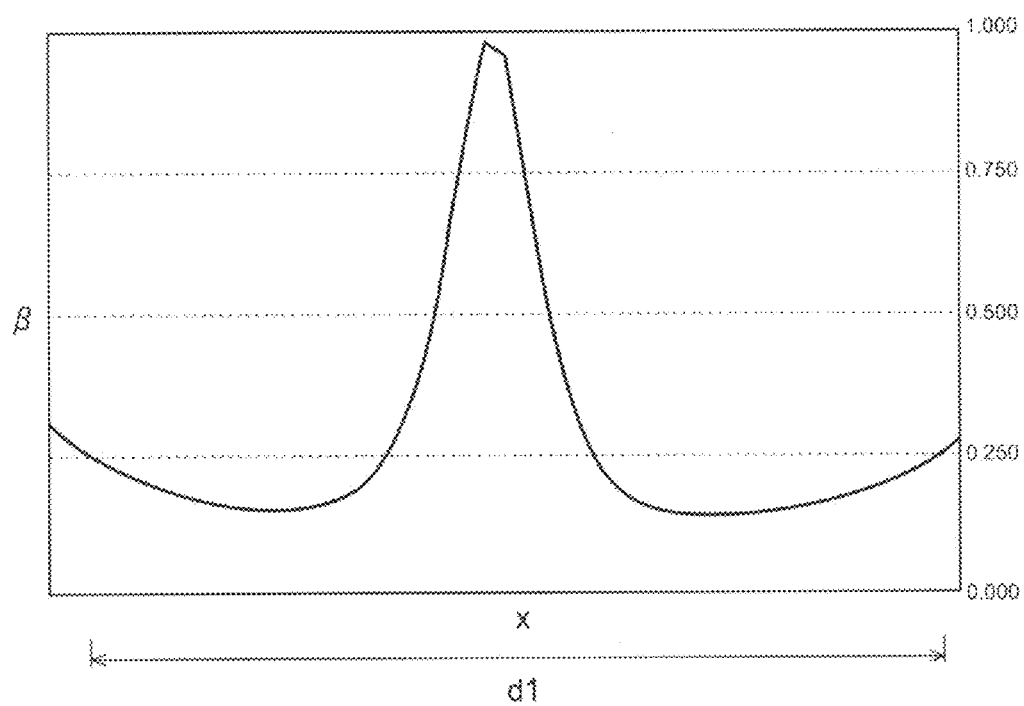

FIG. 8A and FIG. 8B are graphs illustrating characteristics of the reference example.

FIG. 8A is a graph illustrating the transmittance distribution of the liquid crystal optical device 119. The horizontal axis of FIG. 8A is an X-axis direction position x of the liquid crystal optical device 119. The vertical axis of FIG. 8A is a relative transmittance a of the liquid crystal optical device 110 between crossed polarizers when the maximum transmittance in the case of parallel polarizers is used as the reference of the luminance. FIG. 8B is a graph illustrating the refractive index distribution of the liquid crystal optical device 119. The horizontal axis of FIG. 8B is the X-axis direction position x of the liquid crystal optical device 119. The vertical axis of FIG. 8B is a value β which is the refractive index n of the liquid crystal layer 30 normalized by the maximum value inside the region. In FIG. 8A and FIG. 8B, region d1 is the portion in which the first electrode 21 exists. In FIG. 8A, region d2 is the portion in which the second electrode 22 exists.

As shown in FIG. 8B, the refractive index increases in the central vicinity of the first electrode 21 of the liquid crystal optical device 119. This is caused by the twist deformation in the configuration of the liquid crystal molecules 35.

Therefore, as shown in FIG. 8A, a region (region d1 on the first electrode 21) occurs in which the luminance is high. This corresponds to the bright lines described in regard to FIG. 7A and FIG. 7B.

Thus, in the liquid crystal optical device 119 of the reference example, twist deformation in the configuration of the liquid crystal molecules 35 occurs; disclinations occur; and the lens performance degrades. The deformation also induces polarization rotation; and this also leads to the degradation of the lens performance. As a result, uneven luminance becomes apparent on the first electrode 21, that is, in the vicinity of both ends of the refractive index distribution having the convex lens configuration.

The inventor of the application investigated various methods to suppress bright lines such as those occurring in the reference example.

For example, liquid crystal materials having different elasticity moduli, different pretilt angles provided by using various alignment films, etc., when using a homogeneous alignment (a horizontal alignment) as the liquid crystal layer 30 were investigated. Liquid crystal materials having negative dielectric anisotropy with a homeotropic alignment (a vertical alignment), etc., were also investigated. However, it was difficult to eliminate the bright lines in such configurations. In the experiment, a cell having a HAN alignment, i.e., a cell which combines an alignment film for a horizontal alignment and an alignment film for a vertical alignment at the substrates above and below, was made accidentally. The inventor of the application evaluated the HAN cell and discovered that the bright lines recited above do not occur.

In other words, the inventor of the application discovered that the bright lines recited above substantially do not occur by disposing the second electrode 22 between at least two of the first electrodes 21, disposing the first opposing electrode 23 to oppose the first electrodes 21 and the second electrode 22, and providing a liquid crystal layer 30 having a hybrid alignment; the liquid crystal layer 30 has a vertical alignment on the first electrode 21 and second electrode 22 and has a horizontal alignment on the third electrode.

In the liquid crystal optical device 110 according to the embodiment, the liquid crystal layer 30 has a HAN alignment. In the vicinity of the first electrode 21, the liquid crystal layer 30 has a vertical alignment. The liquid crystal molecules 35 deform with substantially the same force regardless of the orientation of the tilt in the case where the vertical alignment is the starting point. The twist deformation in the configuration is not induced. Therefore, it is considered that alignment deformation along the lines of electric force EL naturally does not occur in the vicinity of the first electrode 21 (referring to FIG. 4).

The portion of the liquid crystal layer 30 of the liquid crystal optical device 110 on the side of the second substrate 12 has the horizontal alignment. The projection direction of the long axis of the liquid crystal molecules 35 on the side of the second substrate 12 is regulated. The projection direction of the long axis of the liquid crystal molecules 35 on the side of the second substrate 12 matches the projection direction regulated by the electric field on the side of the first substrate 11. Thereby, the twist deformation is suppressed on both sides of the first substrate 11 and the second substrate 12 in the liquid crystal layer 30 of the liquid crystal optical device 110.

Thus, in the liquid crystal layer 30 having the HAN alignment, the alignment change of the liquid crystal molecules 35 occurs naturally; and the twist deformation is suppressed. Thereby, in the liquid crystal optical device 110, the occurrence of the bright lines caused by the twist deformation in the configuration of the liquid crystal molecules 35 is suppressed; and the resulting crosstalk can be suppressed. According to the embodiment, a liquid crystal optical display that provides a comfortably-viewable display can be provided.

Figure 9:
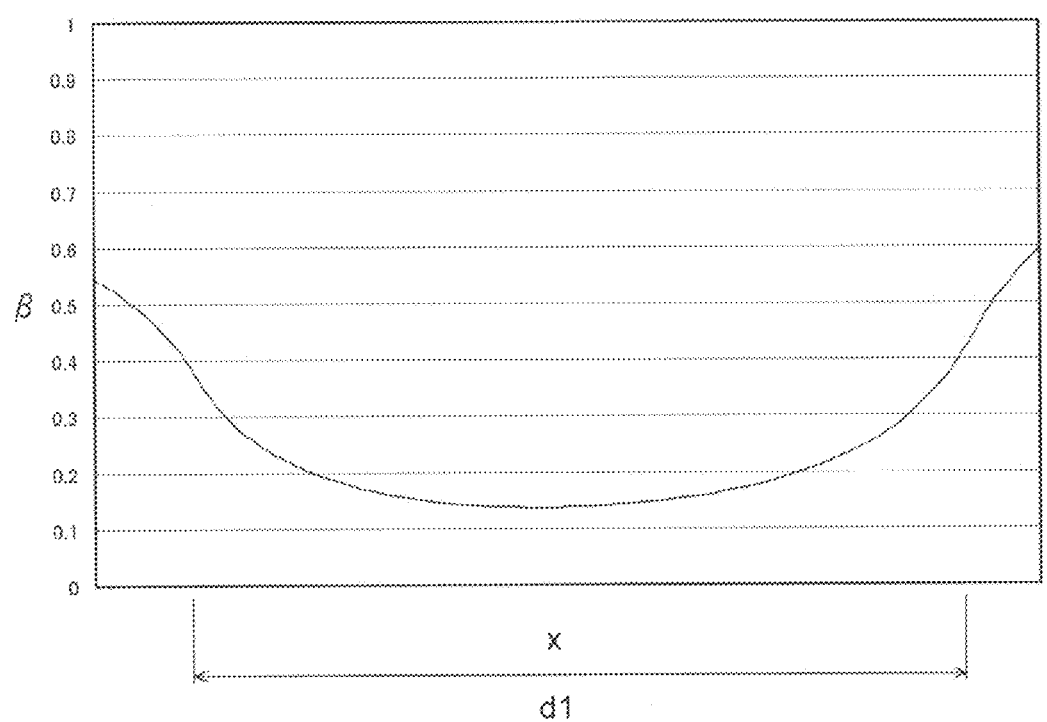
FIG. 9 is a graph showing a characteristic of the stereoscopic image display device according to the first embodiment.

FIG. 9 is a graph illustrating a characteristic of the stereoscopic image display device according to the first embodiment.

Specifically, FIG. 9 is a graph illustrating the refractive index distribution of the liquid crystal optical device 110. The horizontal axis of FIG. 9 is the X-axis direction position x of the liquid crystal optical device 110. The vertical axis of FIG. 9 is the value $\beta$ which is the refractive index n of the liquid crystal layer 30 normalized by the maximum value inside the region.

The first electrode 21 is provided at the center of region d1. In the liquid crystal optical device 110 as shown in FIG. 9, the refractive index is lowest at the portion where the first electrode 21 opposes the first opposing electrode 23. Moreover, the relative transmittance a of the liquid crystal optical device 110 between crossed polarizers is less than 0.1% in the entire region of the position x when the maximum transmittance in the case of parallel polarizers is used as the reference of the luminance.

Thus, in the liquid crystal optical device 110, neither an irregular increase in the refractive index nor the occurrence of an irregular bright lines are observed. In other words, in the liquid crystal optical device 110, the occurrence of the bright lines caused by the twist deformation in the configuration of the liquid crystal molecules 35 and the resulting crosstalk can be suppressed. Thereby, the parallax images can be separated sufficiently. Accordingly, a good 3D display can be realized in the liquid crystal optical device 110.

In the embodiment, the refractive index distribution is formed by partially changing the configuration of the liquid crystal molecules by partially applying a voltage to a liquid crystal layer having a substantially uniform thickness. As a result, a lens effect emerges. The embodiment uses the HAN alignment to suppress the twist deformation of the liquid crystal that occurs characteristically in such a GRIN lens due to the competition between the initial alignment of the liquid crystal and the electric field and to suppress the resulting occurrence of the bright lines. In such a case, the effects recited above can be realized by having the vertical alignment on the side on which the first electrode 21, where the twist deformation recited above occurs, is provided.

The response rate of the HAN alignment is slower than those of the vertical alignment and the horizontal alignment. Therefore, the HAN alignment is not used very favorably in displays, etc. Moreover, the manufacturing processes of the HAN alignment are more complex than those of the vertical alignment and the horizontal alignment because different alignment films are used at the substrates above and below to obtain the HAN alignment. The slow response does not cause a problem in the liquid crystal optical device according to the embodiment as long as the liquid crystal optical device according to the embodiment is used as a lens device for switching between the 2D display and the 3D display. Despite the manufacturing being complex, the HAN alignment is employed to realize the unique effect of suppressing the occurrence of the bright lines by suppressing the twist deformation of the liquid crystal as recited above.

Other than the lens effect in which the light is concentrated (or diverged), the liquid crystal optical device 110 of the embodiment may provide an effect of changing the travel direction of the light (e.g., a prism effect).

Figure 10:
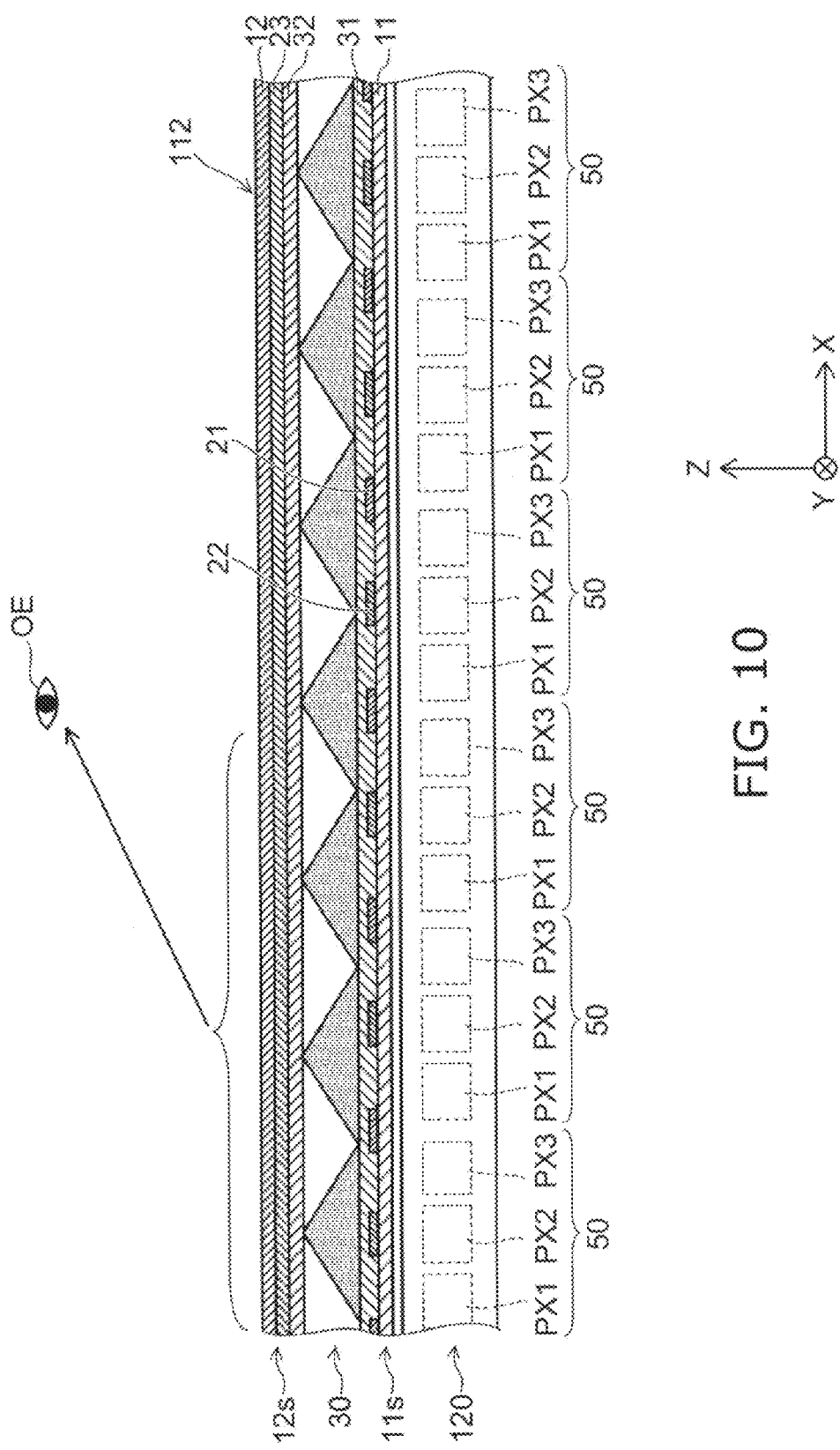
FIG. 10 is a schematic cross-sectional view showing another configuration of the stereoscopic image display device according to the first embodiment.

FIG. 10 is a schematic cross-sectional view illustrating another configuration of the stereoscopic image display device according to the first embodiment.

As shown in FIG. 10, the liquid crystal layer 30 of a liquid crystal optical device 112 has a refractive index distribution having a prism configuration (a triangular prism configuration) in the second state. The refractive index distribution of the liquid crystal layer 30 having the prism configuration can be realized by adjusting, for example, the magnitude of the voltage applied to the first electrode 21, the widths and/or cross-sectional configurations of the first electrode 21 and the second electrode 22, the spacing between the first electrode 21 and the second electrode 22, the thickness of the liquid crystal layer 30, the properties of the liquid crystal material used in the liquid crystal layer 30, etc.

The liquid crystal optical device 112 in the second state causes the light emitted from the pixel groups 50 to be incident on the eyes OE of the viewer by changing the optical path of the light. Thus, the liquid crystal optical device 112 performs a 3D display by causing the light emitted from the multiple pixel groups 50 to be selectively incident on the left and right eyes OE of the viewer by modifying the optical path. The refractive index distribution of the liquid crystal layer 30 utilizing the HAN alignment has a tendency to change linearly compared to those of the vertical alignment and the horizontal alignment. It is possible for the liquid crystal layer 30 utilizing the HAN alignment to form a refractive index distribution having a prism configuration.

Figure 11:
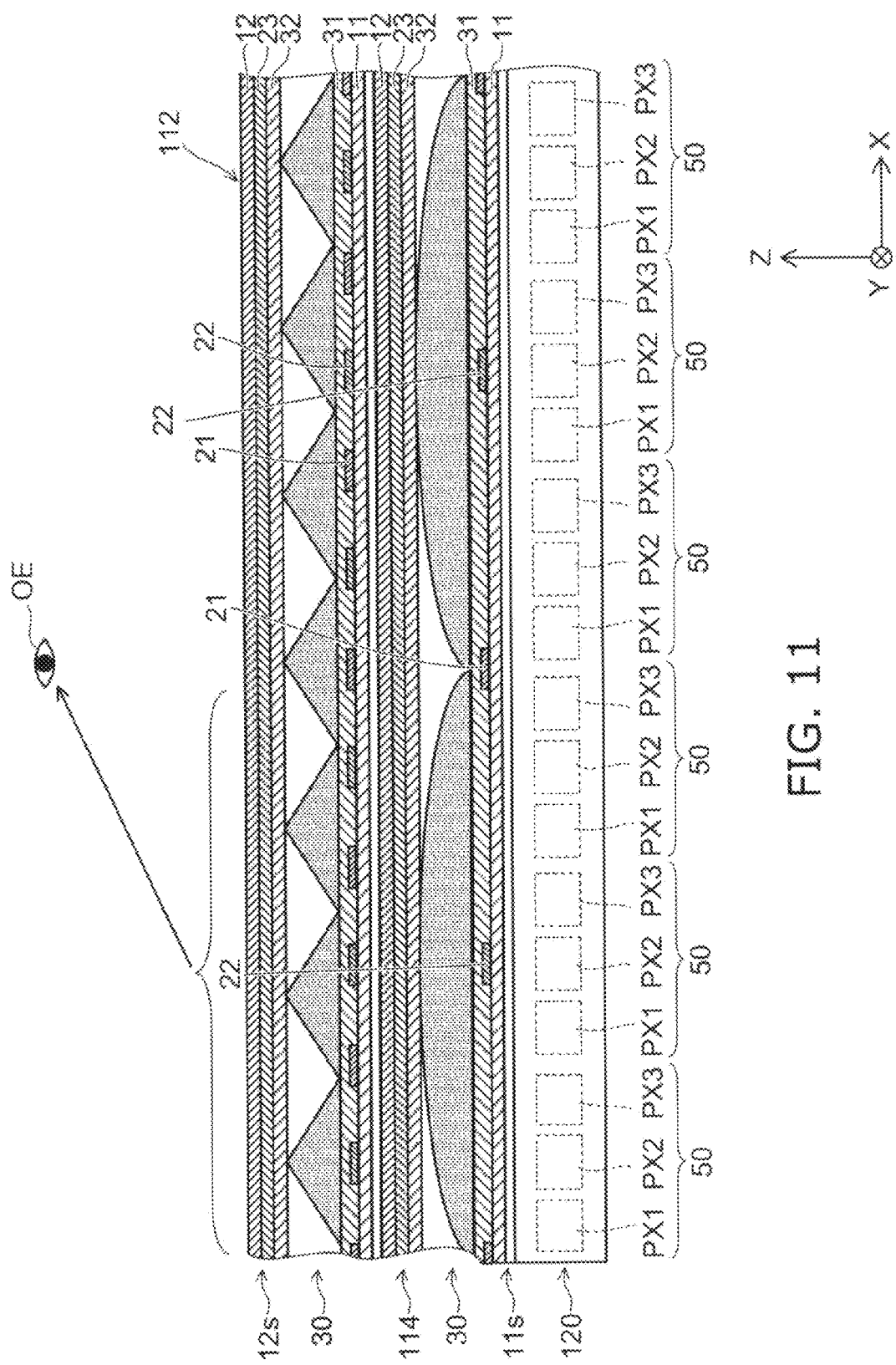
FIG. 11 is a schematic cross-sectional view showing another configuration of the stereoscopic image display device according to the first embodiment.

FIG. 11 is a schematic cross-sectional view illustrating another configuration of the stereoscopic image display device according to the first embodiment.

As shown in FIG. 11, a liquid crystal optical device 114 that includes the liquid crystal layer 30 having a refractive index distribution having a convex lens configuration may be provided on the image display unit 120; and the liquid crystal optical device 112 that includes the liquid crystal layer 30 having a refractive index distribution having a prism configuration may be provided further on the liquid crystal optical device 114. In such a case, the emission direction of the light is switched by performing time-division driving of the liquid crystal optical device 112 for each parallax image. Thereby, the viewing angle range in which the 3D display is possible can be enlarged.

In the configuration in which the liquid crystal optical device 112 is provided on the liquid crystal optical device 114, the focal distance of the convex lens of the liquid crystal optical device 114 formed of the refractive index distribution can be longer than that of the configuration of the liquid crystal optical device 110. Thus, the liquid crystal optical device 114 can include a liquid crystal material 36 having a small refractive index anisotropy ($\Delta n$). Thereby, various material can be selected for the configuration in which the liquid crystal optical device 112 is provided on the liquid crystal optical device 114. Because the convex lens of the liquid crystal optical device 114 is used as a collimating lens to adjust the direction of the light rays incident on the liquid crystal optical device 112, the requirements for alignment precision between the pixel groups 50 and the optical devices can be relaxed. Further, the electrode configurations can be simplified. The configuration of the refractive index distribution of the liquid crystal layer 30 in the second state is not limited to the convex lens configuration and/or the prism configuration; and it is sufficient for the configuration to allow autostereoscopic viewing with the naked eyes.

Figure 12:
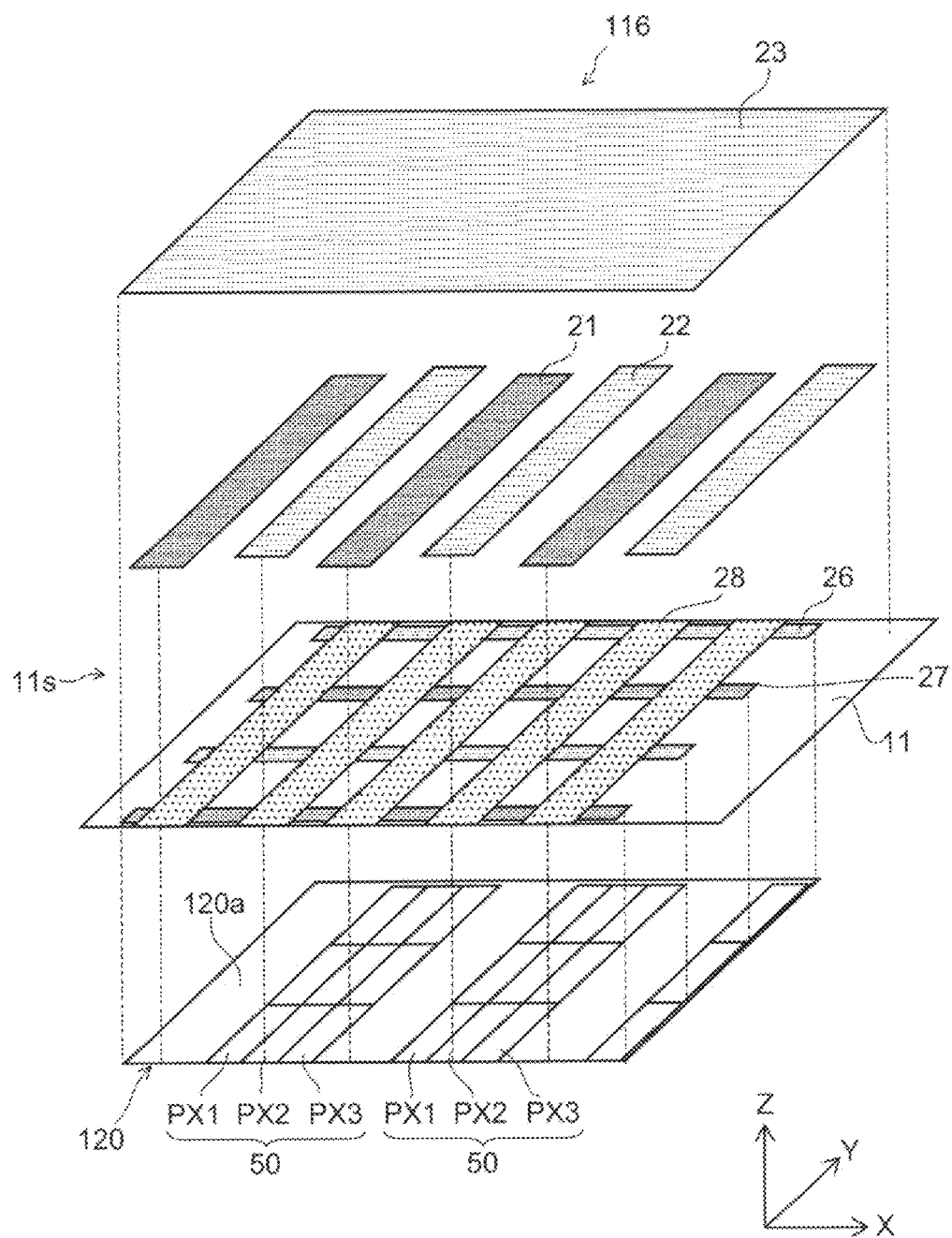
FIG. 12 is a schematic perspective view showing another configuration of the stereoscopic image display device according to the first embodiment.

FIG. 12 is a schematic perspective view illustrating another configuration of the stereoscopic image display device according to the first embodiment.

In a liquid crystal optical device 116 as shown in FIG. 12, the first substrate unit 11s further includes multiple third electrodes 26 and multiple fourth electrodes 27 provided on the first major surface 11a. The multiple third electrodes 26 extend along a direction perpendicular to the first electrodes 21 and the second electrodes 22, i.e., the X-axis direction, to be separated from each other by a constant spacing in the Y-axis direction perpendicular to the X-axis direction. The fourth electrodes 27 are disposed respectively at the central vicinities between the multiple third electrodes 26. The spacing of the third electrodes 26 corresponds to the width of the multiple pixel groups 50 in the Y-axis direction. In the example, the spacing of the third electrodes 26 corresponds to the width of two pixel groups 50 arranged in the Y-axis direction. The spacing of the third electrodes 26 is not limited to the width of the two pixel groups 50 in the Y-axis direction and may be the width of three or more pixel groups 50 in the Y-axis direction. The third electrode 26 opposes the boundary portion of the two pixel groups 50 adjacent to each other in the Y-axis direction. Accordingly, in the example, a rectangular region surrounded by the multiple first electrodes 21 and the multiple third electrodes 26 opposes the two pixel groups 50 arranged in the Y-axis direction.

In the first substrate unit 11s, an inter-layer insulating layer 28 is provided between the third electrodes 26 and the first electrodes 21, between the third electrodes 26 and the second electrodes 22, between the fourth electrodes 27 and the first electrodes 21, and between the fourth electrodes 27 and the second electrodes 22.

In the liquid crystal optical device 116, voltages may be applied individually to the multiple first electrodes 21, the multiple second electrodes 22, the multiple third electrodes 26, and the multiple fourth electrodes 27 by these electrodes being separated from each other.

For example, a voltage is applied to the third electrodes 26; and the first opposing electrode 23 and the fourth electrodes 27 are grounded. Thereby, in the liquid crystal optical device 116, a refractive index distribution having a cylindrical lens configuration along the X-axis direction can be formed in the liquid crystal layer 30.

For example, voltages are applied to the multiple first electrodes 21 and the multiple third electrodes 26; and the multiple second electrodes 22, the first opposing electrode 23, and the multiple fourth electrodes 27 are grounded. Thereby, a refractive index distribution can be formed in the portion of the liquid crystal layer 30 opposing each region surrounded with the multiple first electrodes 21 and the multiple fourth electrodes 27. For example, a refractive index distribution that has a microlens array arranged in a matrix configuration in the X-axis direction and the Y-axis direction can be formed. Because the voltages can be applied individually to the multiple first electrodes 21, the multiple second electrodes 22, the multiple third electrodes 26, and the multiple fourth electrodes 27, various refractive index distributions can be formed; and a wide range of application is realized.

Figure 13:
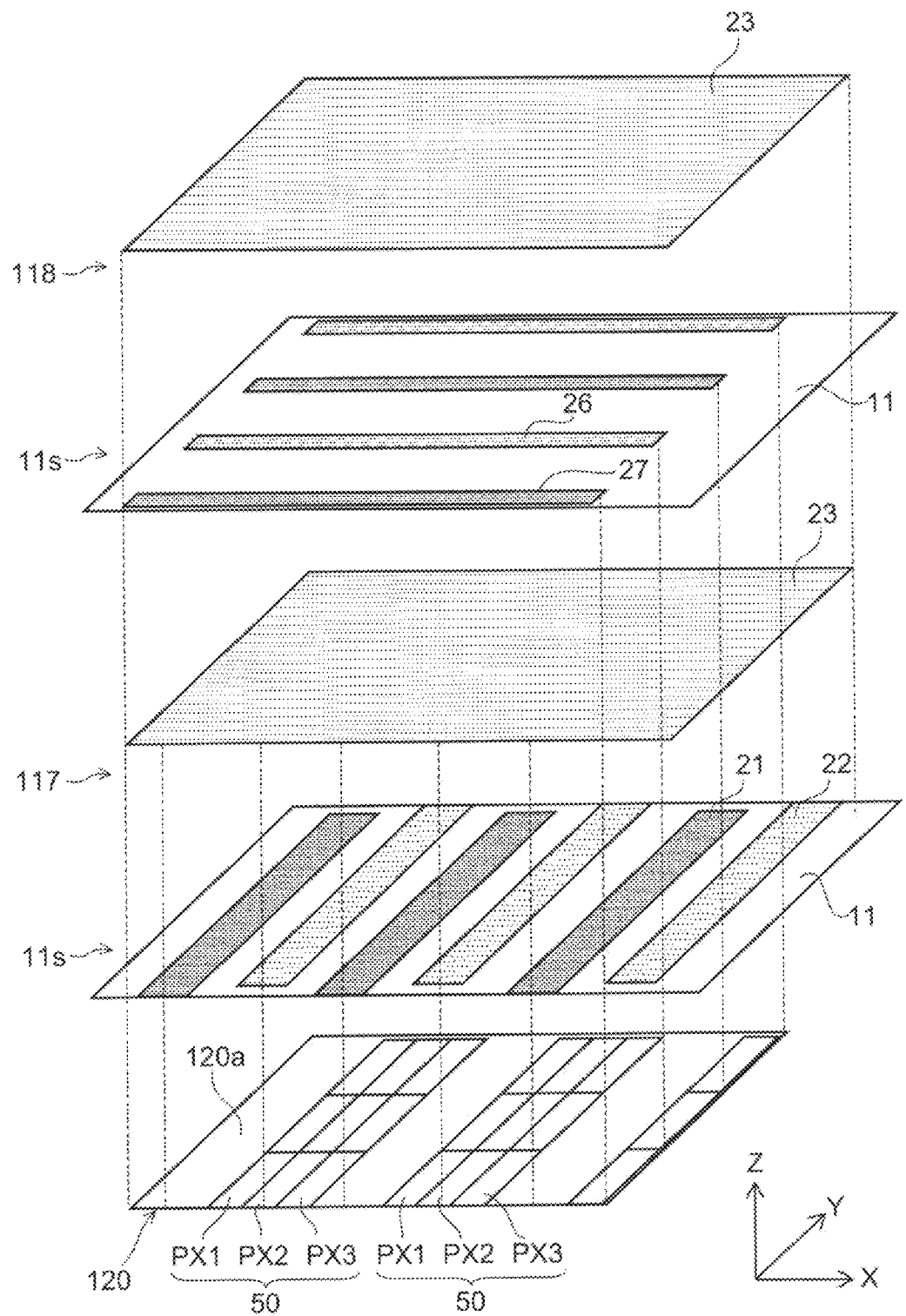
FIG. 13 is a schematic perspective view showing another configuration of the stereoscopic image display device according to the first embodiment.

FIG. 13 is a schematic perspective view illustrating another configuration of the stereoscopic image display device according to the first embodiment.

As shown in FIG. 13, a liquid crystal optical device 117 that includes the first electrodes 21 and the second electrodes 22 may be provided on the image display unit 120; and a liquid crystal optical device 118 that includes the third electrodes 26 and the fourth electrodes 27 may be provided on the liquid crystal optical device 117.

In the liquid crystal optical device 117, a refractive index distribution having a cylindrical lens configuration along the Y-axis direction can be formed in the liquid crystal layer 30. In the liquid crystal optical device 118, a refractive index distribution having a cylindrical lens configuration along the X-axis direction can be formed in the liquid crystal layer 30. Thereby, in the configuration in which the liquid crystal optical device 118 is stacked on the liquid crystal optical device 117, various refractive index distributions can be formed; and a wide range of application can be realized.

The stacking order of the liquid crystal optical device 117 and the liquid crystal optical device 118 is not limited to that recited above; and the liquid crystal optical device 117 may be provided on the liquid crystal optical device 118. The liquid crystal optical devices are not limited to the liquid crystal optical device 117 and the liquid crystal optical device 118; and a liquid crystal optical device that has a different refractive index distribution formed in the liquid crystal layer 30 may further be stacked.

Second Embodiment

Figure 14:
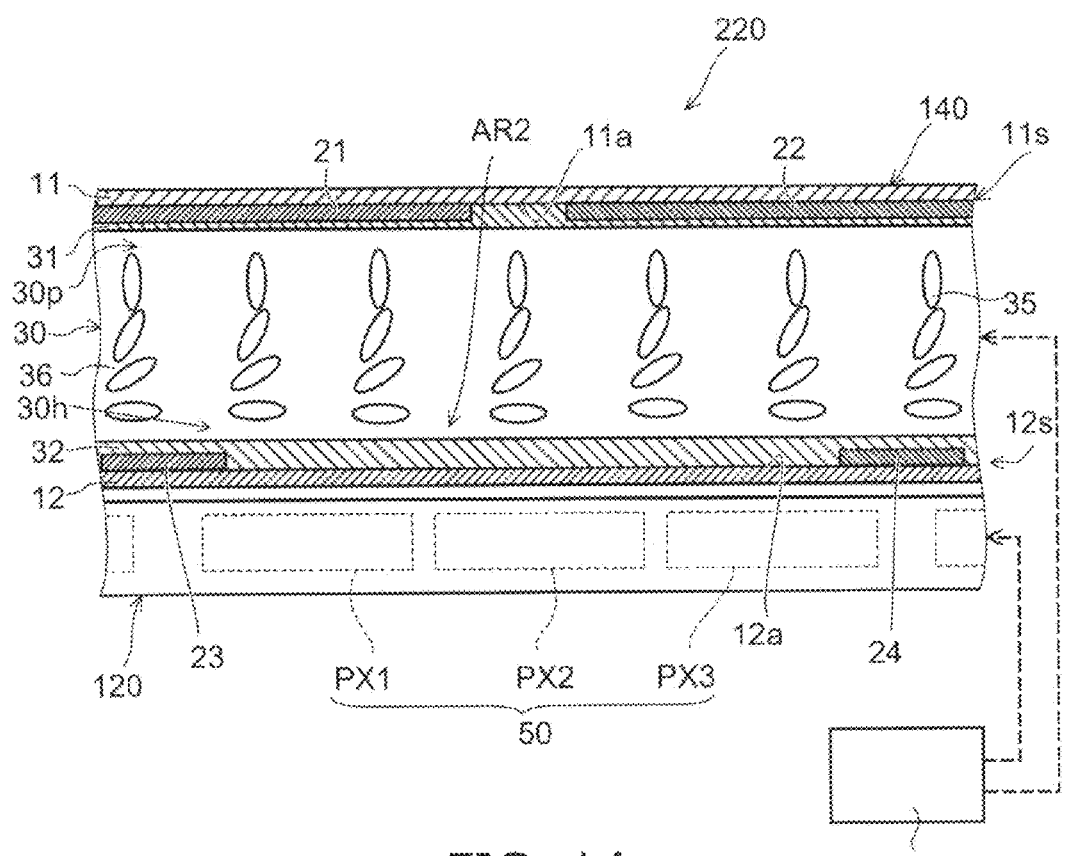
FIG. 14 is a schematic cross-sectional view showing a configuration of a stereoscopic image display device according to a second embodiment.

FIG. 14 is a schematic cross-sectional view illustrating a configuration of a stereoscopic image display device according to a second embodiment.

Figure 15:
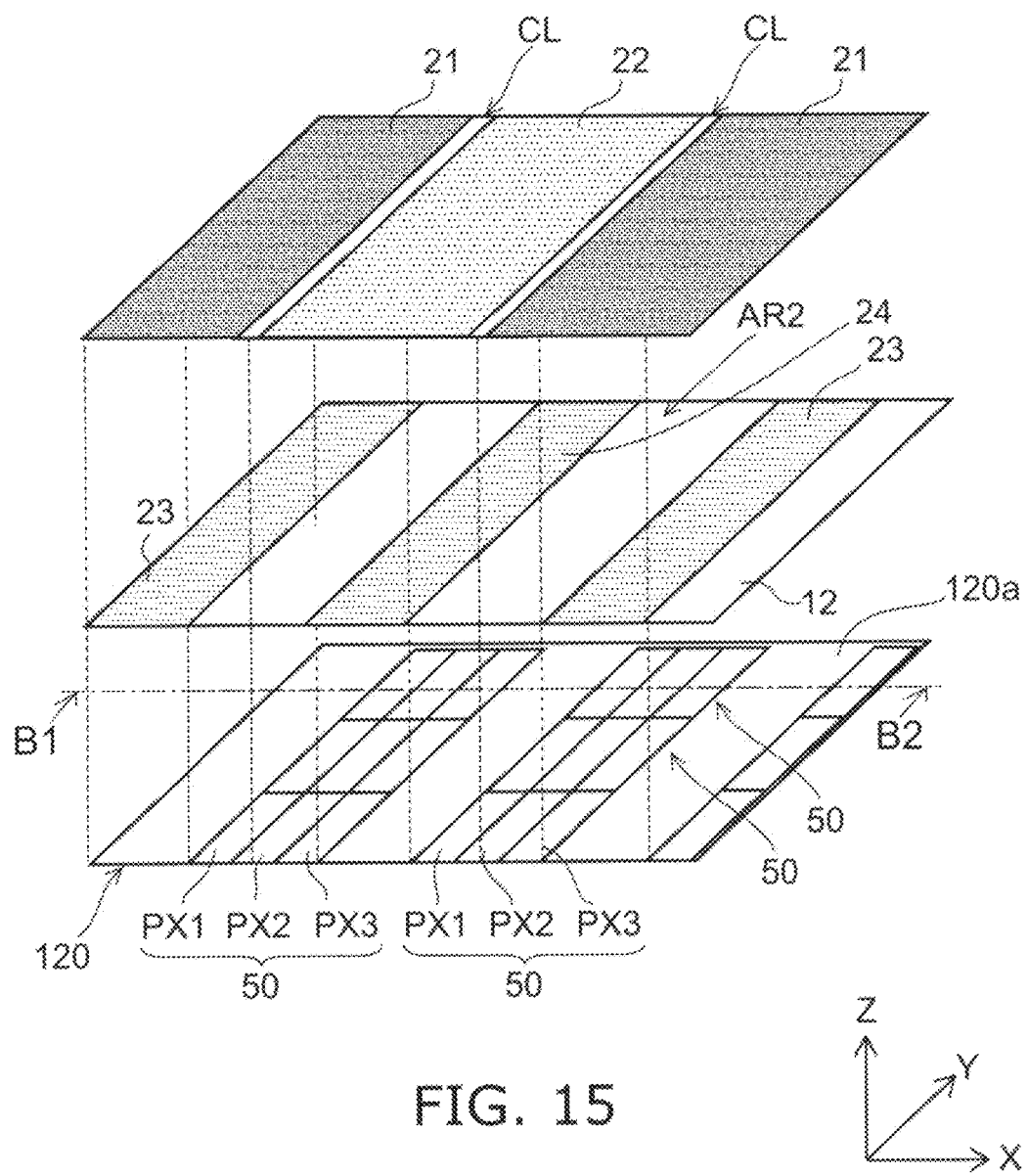
FIG. 15 is a schematic perspective view showing the configuration of a portion of the stereoscopic image display device according to the second embodiment.

FIG. 15 is a schematic perspective view illustrating the configuration of a portion of the stereoscopic image display device according to the second embodiment.

FIG. 14 schematically shows a cross section along line B1-B2 of FIG. 15.

As shown in FIG. 14 and FIG. 15, the stereoscopic image display device 220 includes a liquid crystal optical device 140, the image display unit 120, and the control circuit 130. The configurations of the image display unit 120 and the control circuit 130 are similar to those of the stereoscopic image display device 210.

In the example, the second substrate 12 of the liquid crystal optical device 140 is disposed on the side of the image display unit 120; and the first substrate 11 is disposed on the side of light emission. The multiple first electrodes 21 and the multiple second electrodes 22 are provided on the first major surface 11a of the first substrate 11. The width of a gap CL between the first electrode 21 and the second electrode 22 in the X-axis direction is narrower than the width of the pixel group 50 in the X-axis direction. The first electrode 21 and the second electrode 22 are disposed such that the gap CL opposes central portion of the pixel group 50 in the X-axis direction. One ends of the multiple first electrodes 21 are connected to the first interconnect unit 41; and substantially the same voltage can be applied. Alternatively, voltages may be applied individually to each of the multiple first electrodes 21. The configuration of the multiple second electrodes 22 is similar to those of the multiple first electrodes 21.

The second substrate unit 12s includes the second substrate 12, the first opposing electrodes 23, and second opposing electrodes 24. The first opposing electrodes 23 and the second opposing electrodes 24 are provided on the second major surface 12a of the second substrate 12. The first opposing electrode 23 opposes the first electrode 21 to cover a portion of the first electrode 21. When projected onto the X-Y plane (the first major surface 11a), the first opposing electrode overlays the first electrode 21. The second opposing electrode 24 opposes the second electrode 22 to cover a portion of the second electrode 22. When projected onto the X-Y plane (the first major surface 11a), the second opposing electrode 24 overlays the second electrode 22. The second substrate unit 12s has a region AR2 on the second major surface 12a between the first opposing electrode 23 and the second opposing electrode 24 where an electrode is not provided. The first opposing electrode 23 and the second opposing electrode 24 are disposed to oppose the boundary portions of the pixel groups 50 adjacent to each other in the X-axis direction. The pixel group 50 is disposed to oppose the region AR2 between the first opposing electrode 23 and the second opposing electrode 24. For the multiple first opposing electrodes 23 and the multiple second opposing electrodes 24, one ends of electrodes may be connected to an interconnect unit; and substantially the same voltage can be applied. Alternatively, voltages may be applied individually to the first opposing electrodes 23 and the second opposing electrodes 24.

The liquid crystal layer 30 has the vertical alignment on the side of the first substrate 11 and the horizontal alignment on the side of the second substrate 12. Therefore, in the example, the horizontal alignment is disposed on the side of the image display unit 120.

FIG. 14 shows a state in which a voltage is not applied to the first electrodes 21, the second electrodes 22, the first opposing electrodes 23, and the second opposing electrodes 24. In this state, the liquid crystal layer 30 which is provided with a HAN alignment has a uniform refractive index distribution. Accordingly, in the case where the voltage is not applied to the first electrodes 21, the second electrodes 22, the first opposing electrodes 23, and the second opposing electrodes 24, the liquid crystal optical device 140 is switched to the first state.

To switch the liquid crystal optical device 140 from the first state to the second state, for example, a positive voltage is applied to the first electrodes 21; a negative voltage is applied to the second electrodes 22; and the first opposing electrodes 23 and the second opposing electrodes 24 are grounded.

Figure 16:
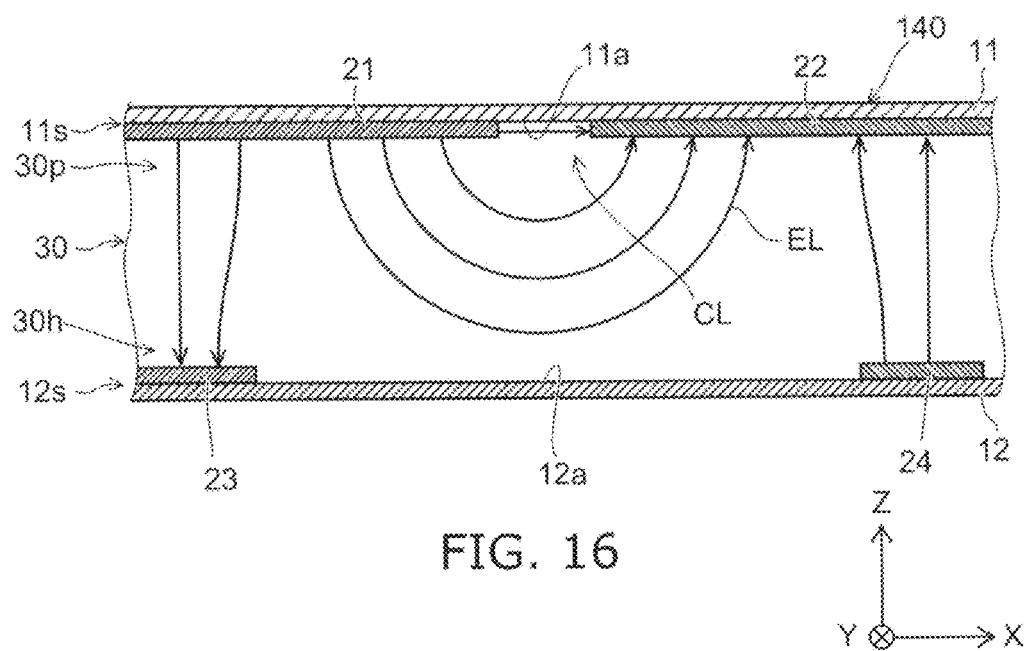
FIG. 16 is a schematic cross-sectional view showing the configuration of a portion of the stereoscopic image display device according to the second embodiment.

FIG. 16 is a schematic cross-sectional view illustrating the configuration of a portion of the stereoscopic image display device according to the second embodiment.

As shown in FIG. 16, the lines of electric force EL around the first electrode 21 are generated when the voltages are applied as recited above to the first electrodes 21, the second electrodes 22, the first opposing electrodes 23, and the second opposing electrodes 24. The lines of electric force EL in the region from the vicinity of the gap CL to the portion opposing the gap CL have components parallel to the X-Y plane. Further, the lines of electric force EL are dense (the electric field is strong) in the vicinity of the gap CL.

Figure 17:
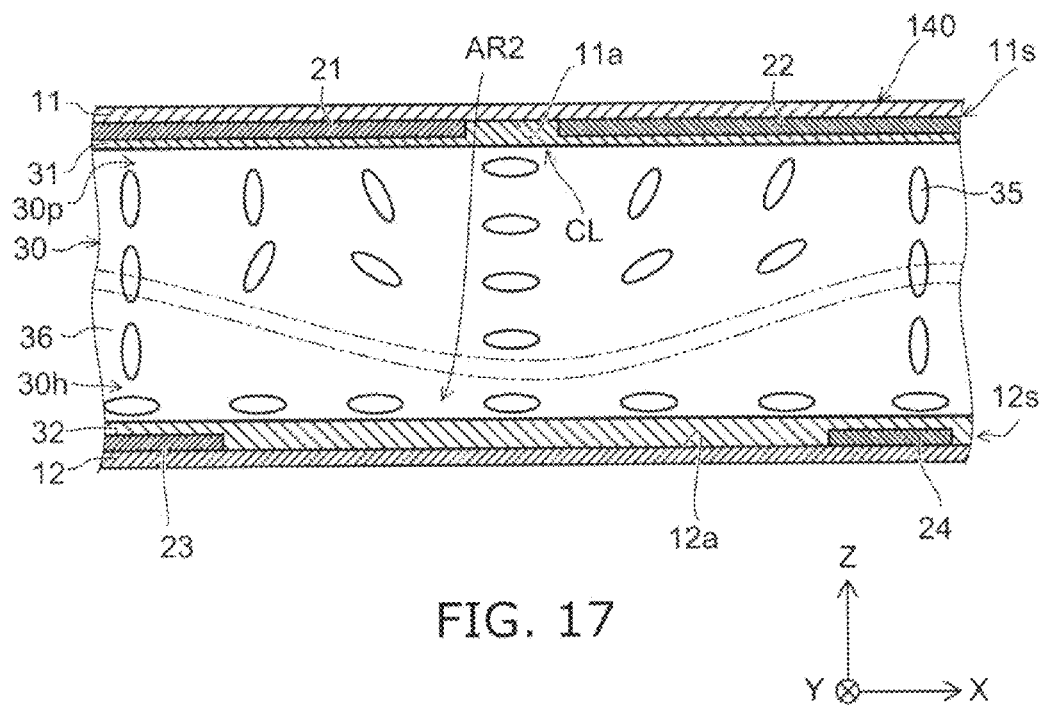
FIG. 17 is a schematic cross-sectional view showing the configuration of a portion of the stereoscopic image display device according to the second embodiment.

FIG. 17 is a schematic cross-sectional view illustrating the configuration of a portion of the stereoscopic image display device according to the second embodiment.

In the case where the dielectric anisotropy of the liquid crystal layer 30 is positive as shown in FIG. 17, the alignment of the liquid crystal molecules 35 deforms along the lines of electric force EL. In the example, in the portion opposing the gap CL on the side of the first substrate 11, the alignment approaches the horizontal alignment from the vertical alignment. In the region between the gap CL and the first opposing electrode 23 on the side of the first substrate 11, the angle of the liquid crystal molecules 35 changes gradually from the first opposing electrode 23 toward the gap CL to approach the horizontal alignment. In the region between the gap CL and the second opposing electrode 24 on the side of the first substrate 11, the angle of the liquid crystal molecules 35 changes gradually from the second opposing electrode 24 toward the gap CL to approach the horizontal alignment. The refractive index in the gap CL portion of the liquid crystal layer 30 of the liquid crystal optical device 140 is high. The refractive index decreases gradually from the gap CL toward the portion where the first electrode 21 opposes the first opposing electrode 23; and the refractive index decreases gradually from the gap CL toward the portion where the second electrode 22 opposes the second opposing electrode 24. Thus, for the configuration of the liquid crystal optical device 140 as well, a refractive index distribution having a lens configuration occurs in the portion opposing the pixel group 50 by applying the voltages to the first electrodes 21, the second electrodes 22, the first opposing electrodes 23, and the second opposing electrodes 24; and the liquid crystal optical device 140 is changed from the first state to the second state.

Figure 18:
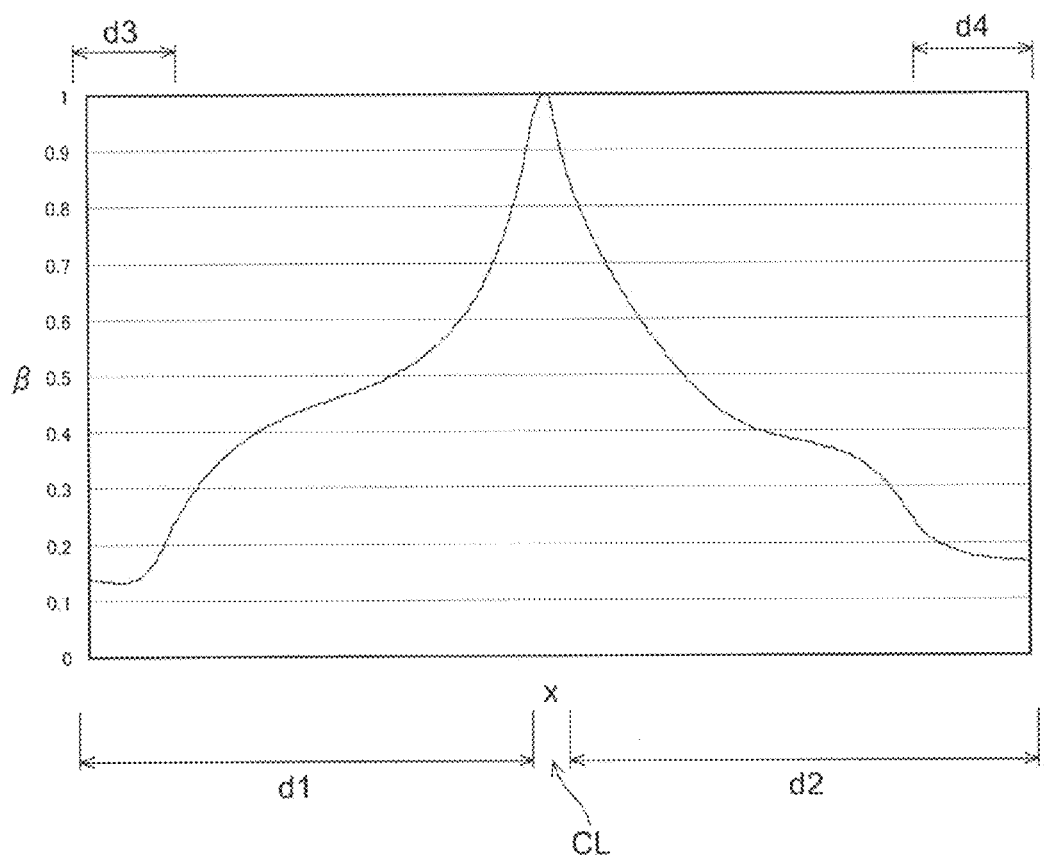
FIG. 18 is a graph showing a characteristic of the stereoscopic image display device according to the second embodiment.

FIG. 18 is a graph illustrating a characteristic of the stereoscopic image display device according to the second embodiment. FIG. 18 is a graph illustrating the refractive index distribution of the liquid crystal optical device 140.

The horizontal axis of FIG. 18 is the X-axis direction position x of the liquid crystal optical device 140. The vertical axis of FIG. 18 is the value β which is the refractive index n of the liquid crystal layer 30 normalized by the maximum value inside the region.

In FIG. 18, region d1 is the portion in which the first electrode 21 exists. Region d2 is the portion in which the second electrode 22 exists. Region d3 is the portion in which the first opposing electrode 23 exists. Region d4 is the portion in which the second opposing electrode 24 exists. The direction of Z-axis in FIG. 18 is inverted from those in FIG. 14 to FIG. 17.

As shown in FIG. 18, the refractive index of the liquid crystal optical device 140 is high at the gap CL portion. The refractive index of the liquid crystal optical device 140 decreases gradually in the direction from the gap CL toward the first opposing electrode 23 and decreases gradually in the direction from the gap CL toward the second opposing electrode 24. Thus, the irregular increase of the refractive index is not found in the liquid crystal optical device 140.

For the configuration of the liquid crystal optical device 140 as well, the occurrence of the bright lines caused by the twist deformation in the configuration of the liquid crystal molecules 35 and the resulting crosstalk can be suppressed. In the liquid crystal optical device 140, the tilt angle of the liquid crystal molecules 35 of the liquid crystal layer 30 having the vertical alignment in the portion of the gap CL on the side of the first substrate 11 can be reduced by the electric field in the horizontal direction (parallel direction to the substrate). Therefore, the modulation amount of the refractive index can be larger for the liquid crystal optical device 140 than for the configuration of the liquid crystal optical device 110.

In the liquid crystal optical device 140, the first substrate 11 may be disposed on the side of the image display unit 120. The liquid crystal layer 30 of the liquid crystal optical device 140 may have a refractive index distribution of another configuration.

According to the embodiments of the invention, a liquid crystal optical device and a stereoscopic image display device that provide a comfortably-viewable display are provided.

Hereinabove, exemplary embodiments of the invention are described with reference to specific examples. However, the invention is not limited to these specific examples. For example, one skilled in the art may similarly practice the invention by appropriately selecting specific configurations of components included in the stereoscopic image display device such as the image display unit, the liquid crystal optical device, the first substrate unit, the second substrate unit, the liquid crystal layer, the first substrate, the second substrate, the first electrode, the second electrode, the first opposing electrode, the second opposing electrode, etc., from known art; and such practice is within the scope of the invention to the extent that similar effects are obtained.

Further, any two or more components of the specific examples may be combined within the extent of technical feasibility and are included in the scope of the invention to the extent that the purport of the invention is included.

Moreover, all liquid crystal optical devices and stereoscopic image display devices practicable by an appropriate design modification by one skilled in the art based on the liquid crystal optical devices and stereoscopic image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal optical device, comprising:
a first substrate unit including
a first substrate having a first major surface,
a plurality of first electrodes provided on the first major surface, the first electrodes extending along a first direction; and
a plurality of second electrodes provided on the first major surface, each of the second electrodes being provided at each position between two of the first electrodes, the second electrodes not overlaying the first electrodes when projected onto the first major surface;
a second substrate unit including
a second substrate having a second major surface opposing the first major surface, and
a first opposing electrode provided on the second major surface, the first opposing electrode overlaying the first electrodes and the second electrodes when projected onto the first major surface; and
a liquid crystal layer provided between the first substrate unit and the second substrate unit, the liquid crystal layer includes a first portion provided on a side of the first substrate unit and a second portion provided on a side of the second substrate unit, the first portion having a vertical alignment, the second portion having a horizontal alignment, a long axis of liquid crystal molecules in the second portion aligning along a second direction perpendicular to the first direction;
a controller electrically connected with the first electrodes, the second electrodes, and the first opposing electrode and configured to make an absolute value of a voltage between at least one of the first electrodes and the first opposing electrode greater than an absolute value of a voltage between at least one of the second electrodes and the first opposing electrode.

2. The device according to claim 1, wherein the first electrodes are separated from each other in the second direction.

3. The device according to claim 1, wherein second electrodes extent along the first direction and are separated from the first electrodes in the second direction.

4. The device according to claim 3, wherein the second substrate unit further includes a second opposing electrode and the second opposing electrode overlays the second electrode when projected on the first major surface.

5. The device according to claim 1, wherein at least one of the second electrodes overlays a central line of two of the mutually-adjacent first electrodes.

6. The device according to claim 1, wherein
the first substrate unit further includes a first alignment film provided between the first electrodes and the liquid crystal layer, and between the second electrodes and the liquid crystal layer, and the first alignment film causes the liquid crystal molecules in the first portion to have the vertical alignment, and
the second substrate unit further includes a second alignment film provided between the first opposing electrode and the liquid crystal layer, and the second alignment film causes the liquid crystal molecules in the second portion to have the horizontal alignment.

7. The device according to claim 1, wherein
an angle between a long axis of liquid crystal molecules in the first portion and the first major surface is not less than 60° and not more than 90°, and
an angle between the long axis of liquid crystal molecules in the second portion and the direction perpendicular to the first major surface is not less than 0° and not more than 30°.

8. The device according to claim 1, wherein
the first substrate unit further includes;
a plurality of third electrodes provided on the first major surface and extending along the second direction,
a plurality of fourth electrodes provided on the first major surface and extending along the second direction, each of the fourth electrodes being provided at each position between two of the third electrodes, and
an inter-layer insulating layer provided between the third electrodes and the first electrode, between the third electrodes and the second electrode, between the fourth electrodes and the first electrode, and between the fourth electrodes and the second electrode.

9. A stereoscopic image display device, comprising:
a liquid crystal optical device including;
a first substrate unit including:
a first substrate having a first major surface;
a plurality of first electrodes provided on the first major surface, the first electrodes extending along a first direction and
a plurality of second electrodes provided on the first major surface, each of the second electrodes is provided at each position between two of the first electrodes, the second electrodes not overlaying the first electrodes when projected onto the first major surface,
a second substrate unit including:
a second substrate having a second major surface opposing the first major surface; and
a first opposing electrode provided on the second major surface, first opposing electrode overlaying the first electrodes and the second electrodes when projected onto the first major surface,
a liquid crystal layer provided between the first substrate unit and the second substrate unit, the liquid crystal layer including a first portion provided on a side of the first substrate unit and a second portion provided on a side of the second substrate unit, the first portion having a vertical alignment, the second portion having a horizontal alignment, a long axis of liquid crystal molecules in the second portion aligning along a second direction perpendicular to the first direction, and
a controller electrically connected with the first electrodes, the second electrodes, and the first opposing electrode and configured to make an absolute value of a voltage between at least one of the first electrodes and the first opposing electrode greater than an absolute value of a voltage between at least one of the second electrodes and the first opposing electrode; and
an image display unit stacked with the liquid crystal optical device, the image display unit being configured to display an image.

10. The device according to claim 9, wherein
the second electrodes extend along the first direction and are separated from the first electrodes in the second direction.

11. The device according to claim 9, wherein the first electrodes are separated from each other in the second direction.

12. The device according to claim 9 wherein the second substrate unit further includes a second opposing electrode and the second opposing electrode overlays the second electrode when projected on the first major surface.

13. The device according to claim 9, wherein
the first substrate unit further includes a first alignment film provided between the first electrodes and the liquid crystal layer, and between the second electrodes and the liquid crystal layer, and the first alignment film causes the liquid crystal molecules in the first portion to have the vertical alignment, and
the second substrate unit further includes a second alignment film provided between the first opposing electrode and the liquid crystal layer, and the second alignment film causes the liquid crystal molecules in the second portion to have the horizontal alignment.

14. The device according to claim 9, wherein
an angle between a long axis of liquid crystal molecules in the first portion and the first major surface is not less than 60° and not more than 90°, and
an angle between the long axis of liquid crystal molecules in the second portion and the direction perpendicular to the first major surface is not less than 0° and not more than 30°.

15. The device according to claim 9, wherein
the first substrate unit further includes;
a plurality of third electrodes provided on the first major surface and extending along the second direction,
a plurality of fourth electrodes provided on the first major surface and extending along the second direction, each of the fourth electrodes being provided at each position between two of the third electrodes, and
an inter-layer insulating layer provided between the third electrodes and the first electrode, between the third electrodes and the second electrode, between the fourth electrodes and the first electrode, and between the fourth electrodes and the second electrode.

* * * * *